(12) United States Patent
Jobanputra et al.

(10) Patent No.: US 9,032,091 B2
(45) Date of Patent: May 12, 2015

(54) APPARATUS AND METHOD FOR MANAGING A NETWORK OF INTELLIGENT DEVICES

(75) Inventors: Asad Jobanputra, Mississauga (CA); Yousif Hassan, Mississauga (CA)

(73) Assignee: Esprida Corporation, Mississauga, Ontario (CA)

( * ) Notice: Subject to any disclaimer, the term of this patent is extended or adjusted under 35 U.S.C. 154(b) by 767 days.

(21) Appl. No.: 11/403,229

(22) Filed: Apr. 12, 2006

(65) Prior Publication Data
US 2006/0259604 A1 Nov. 16, 2006

Related U.S. Application Data

(60) Provisional application No. 60/672,202, filed on Apr. 15, 2005.

(51) Int. Cl.
G06F 15/173 (2006.01)
H04L 12/24 (2006.01)
H04L 29/08 (2006.01)

(52) U.S. Cl.
CPC ........ *H04L 41/5074* (2013.01); *H04L 41/0226* (2013.01); *H04L 41/0806* (2013.01); *H04L 41/0809* (2013.01); *H04L 41/082* (2013.01); *H04L 41/0893* (2013.01); *H04L 67/34* (2013.01); *H04L 67/125* (2013.01)

(58) Field of Classification Search
CPC ....... H04L 12/24; H04L 41/00; H04L 43/065; H04L 43/0817; H04L 41/0226; H04L 41/0806; H04L 41/0809; H04L 67/125; H04L 41/0893; H04L 41/5074; H04L 67/34; H04L 41/082; H04L 41/024; H04L 4/08931; H04L 41/0213

USPC .......................................... 709/203, 220–229
See application file for complete search history.

(56) References Cited

U.S. PATENT DOCUMENTS 5,761,071 A 6/1998 Bernstein et al. ........ 364/479.07
5,826,267 A 10/1998 McMillan .......................... 707/9
(Continued)

FOREIGN PATENT DOCUMENTS

EP 1 376 930 A2 1/2004 ............. H04L 12/24
WO WO 96/26588 8/1996 ............. H04L 12/24
(Continued)

OTHER PUBLICATIONS

International Search Report; Dated Jan. 30, 2007; Received Feb. 6, 2007; PCT/US2006/013542.
(Continued)

*Primary Examiner* — Philip Chea
*Assistant Examiner* — Marcus McKenzie
(74) *Attorney, Agent, or Firm* — Sunstein Kann Murphy & Timbers LLP

(57) ABSTRACT

Systems and methods of managing a network of intelligent devices in communication with a server are disclosed. For each intelligent device that is part of a network a client process associated with the device issues a query to the device causing the issuance of a query to the server for instructions. In a controllable response to the query as a result of the client process the server causes at least one of: (i) downloading, for storage local to the device, at least one of data and instructions, for use in association with the device and (ii) uploading of data pertinent to the device.

26 Claims, 35 Drawing Sheets

(56) References Cited

U.S. PATENT DOCUMENTS

| | | | |
|---|---|---|---|
| 6,078,848 A | 6/2000 | Bernstein et al. | 700/237 |
| 6,212,563 B1* | 4/2001 | Beser | 709/227 |
| 6,216,169 B1* | 4/2001 | Booman et al. | 709/246 |
| 6,295,527 B1 | 9/2001 | McCormack et al. | 707/3 |
| 6,377,162 B1 | 4/2002 | Delestienne et al. | 340/286.07 |
| 6,631,247 B1 | 10/2003 | Motoyama et al. | 399/8 |
| 6,687,735 B1* | 2/2004 | Logston et al. | 709/203 |
| 6,741,853 B1* | 5/2004 | Jiang et al. | 455/418 |
| 6,757,714 B1 | 6/2004 | Hansen | 709/206 |
| 6,779,030 B1* | 8/2004 | Dugan et al. | 709/223 |
| 6,782,388 B2* | 8/2004 | Majewski et al. | 1/1 |
| 7,016,064 B2 | 3/2006 | Iida et al. | 358/1.15 |
| 7,835,508 B1* | 11/2010 | Katz | 379/93.12 |
| 7,890,581 B2* | 2/2011 | Rao et al. | 709/204 |
| 7,911,320 B2* | 3/2011 | Ehrman et al. | 340/5.2 |
| 2001/0044840 A1* | 11/2001 | Carleton | 709/223 |
| 2002/0032725 A1* | 3/2002 | Araujo et al. | 709/203 |
| 2002/0046108 A1 | 4/2002 | Conrad et al. | 705/14 |
| 2002/0052941 A1* | 5/2002 | Patterson | 709/223 |
| 2002/0069244 A1* | 6/2002 | Blair et al. | 709/203 |
| 2002/0116485 A1* | 8/2002 | Black et al. | 709/223 |
| 2002/0116550 A1 | 8/2002 | Hansen | 709/330 |
| 2002/0138443 A1* | 9/2002 | Schran et al. | 705/64 |
| 2002/0157035 A1* | 10/2002 | Wong et al. | 714/4 |
| 2002/0161885 A1* | 10/2002 | Childers et al. | 709/224 |
| 2003/0037128 A1 | 2/2003 | Beadles et al. | 709/220 |
| 2003/0040897 A1* | 2/2003 | Murphy et al. | 703/18 |
| 2003/0118353 A1 | 6/2003 | Baller et al. | 399/8 |
| 2003/0200349 A1 | 10/2003 | Hansen | 709/315 |
| 2004/0027376 A1 | 2/2004 | Calder et al. | 345/755 |
| 2004/0075619 A1 | 4/2004 | Hansen | 345/1.1 |
| 2004/0111730 A1* | 6/2004 | Apte | 719/330 |
| 2004/0133563 A1 | 7/2004 | Harvey et al. | 707/3 |
| 2004/0177124 A1 | 9/2004 | Hansen | 709/206 |
| 2004/0230681 A1* | 11/2004 | Strassner et al. | 709/226 |
| 2004/0236843 A1* | 11/2004 | Wing et al. | 709/219 |
| 2005/0021772 A1 | 1/2005 | Shedrinsky | 709/228 |
| 2005/0027851 A1* | 2/2005 | McKeown et al. | 709/224 |
| 2006/0026281 A1* | 2/2006 | Hodgson et al. | 709/224 |
| 2007/0239672 A1* | 10/2007 | Paranthaman et al. | 707/3 |
| 2008/0133716 A1* | 6/2008 | Rao et al. | 709/220 |
| 2008/0136584 A1* | 6/2008 | Ehrman et al. | 340/5.2 |
| 2008/0163075 A1* | 7/2008 | Beck et al. | 715/759 |

FOREIGN PATENT DOCUMENTS

| | | | | |
|---|---|---|---|---|
| WO | WO 98/26548 | 6/1998 | | H04L 29/06 |
| WO | WO 02/25501 | 3/2002 | | G06F 17/30 |
| WO | WO 02/41141 | 5/2002 | | G06F 9/00 |
| WO | WO 03/054439 | 7/2003 | | |
| WO | WO 03/090078 | 10/2003 | | G06F 9/45 |
| WO | WO 03/090119 | 10/2003 | | G06F 17/30 |
| WO | WO 03/090407 | 10/2003 | | H04L 12/24 |
| WO | WO 2004/003724 | 1/2004 | | G06F 3/14 |

OTHER PUBLICATIONS

International Search Report; Dated Oct. 30, 2006; Received Nov. 7, 2006; PCT/US2006/013542.

Canadian Official Action; Application No. 2,604,312; 3 pages, Jan. 24, 2013.

Government of India Patent Office, India Office Action—Application No. 4548/CHENP/2007, 2 pages, dated Mar. 26, 2014.

* cited by examiner

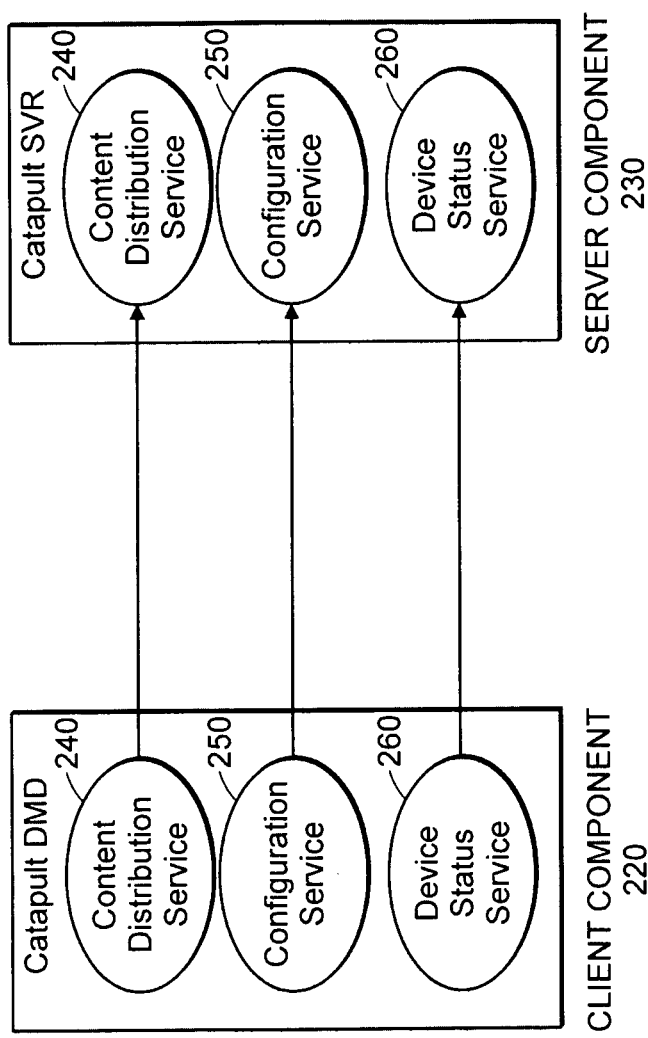
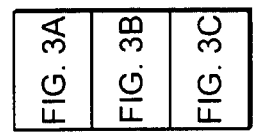
FIG. 2
FIG. 3

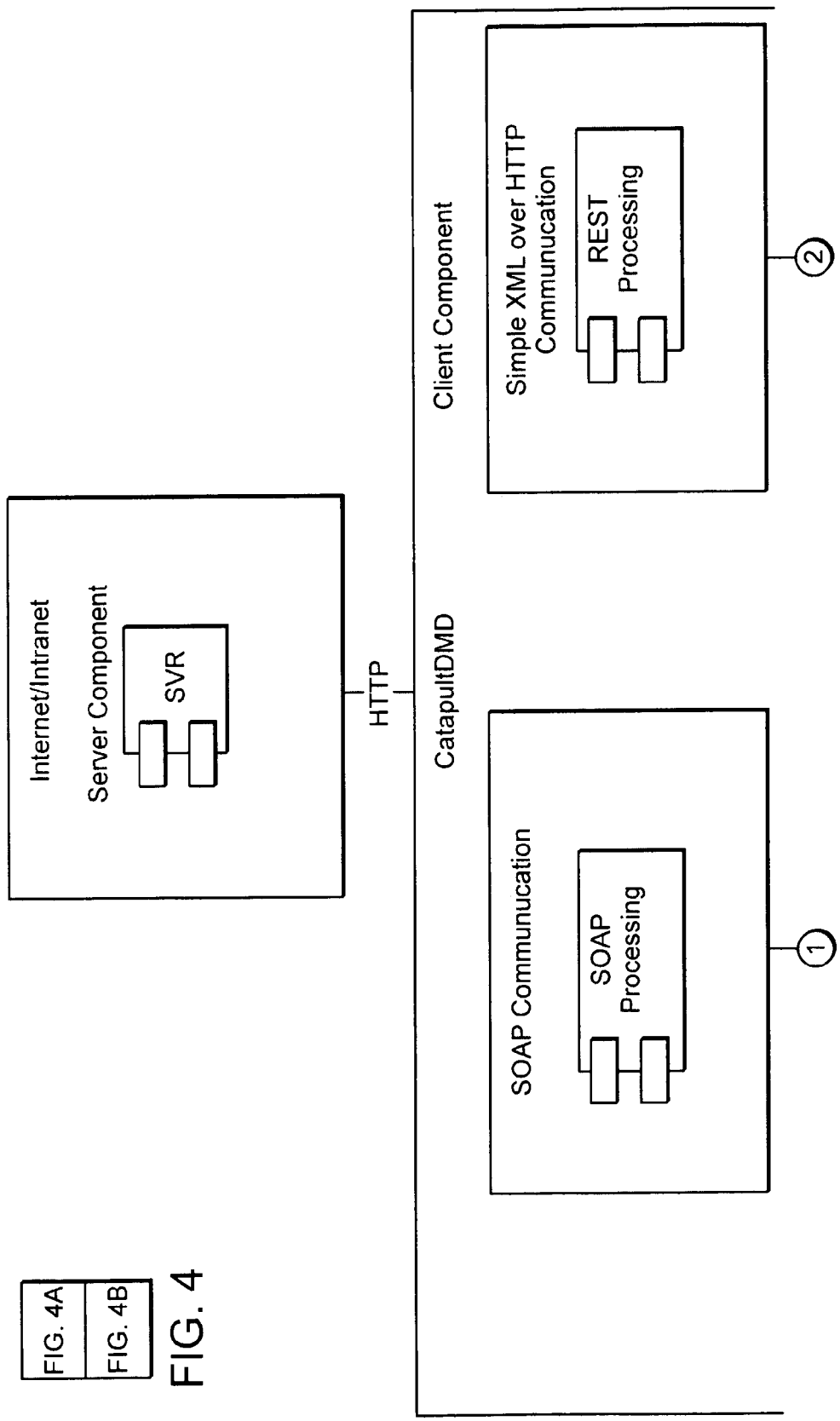

ESPRIDA*

User: owner                                                                                      Configuration | Help | Logout My Esprida | Devices | Device Profiles | Rules | Users | Digital Content | Reports

800

SetUp New Profile

Step 2 of 7 — Set properties: Busines setup

Organization: Esprida, ET-Org-01, Tim,
Source Devices:
Devices selected: 810

Note that fields containing only spaces areconsidered to be empty.

820

Store
Street
City
State / Region
Zip Code
Country
Fred

Name
Phone 1
Phone 2

Back  Next

* mandatory

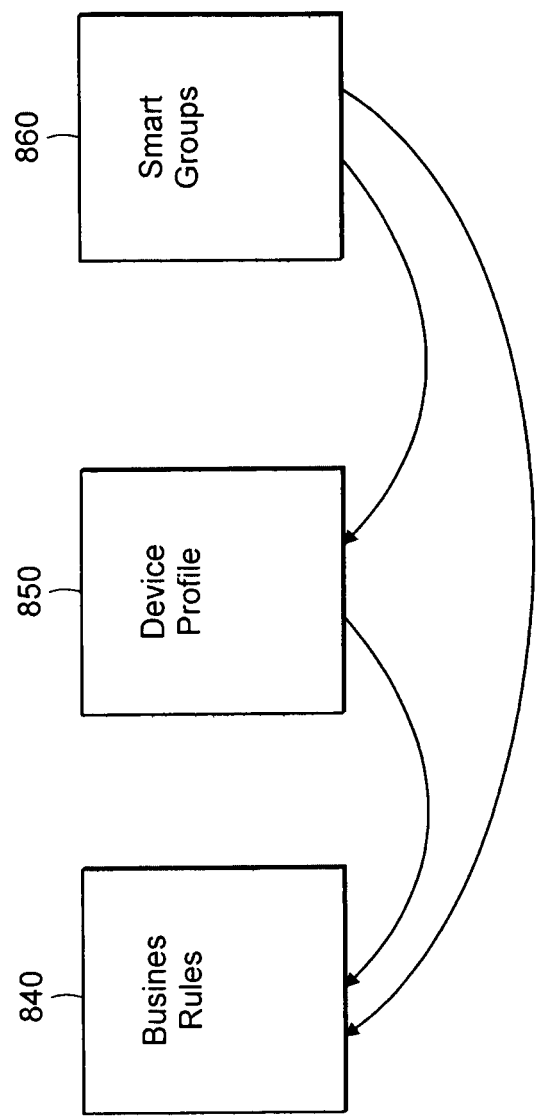

| Reports List | | | | | | | |
|---|---|---|---|---|---|---|---|
| | | | | | | Edit | Clone | Delete |
| Name | Type | Category | Date and Time | Target Device | Details/Comments | | |
| ○ Sales Revenue (New England) | Business | Application Transactions | 12/05/05 11:35 | Group abc | these are the comments | | |
| ○ Sessions by Region | Business | Log Activity | 12/05/05 11:35 | Greater Toronto | these are the comments | | |
| ● Log Activity by Profile | Technical | Log Activity | 12/05/05 11:35 | Device Type 123 | these are the comments | | |
| ○ Printer Alerts Region | Technical | Alerts and Notifications | 12/05/05 11:35 | Network a | these are the comments | | |
| ○ CPU Errors | Technical | Events | 12/05/05 11:35 | Group abc | these are the comments | | |
| ○ Sessions by Day (New York) | Technical | System Usage | 12/05/05 11:35 | Greater Toronto | these are the comments | | |
| ○ Sessions by Hour (Toronto) | Business | System Usage | 12/05/05 11:35 | None selected | these are the comments | | |

Search:

Create a new report: — 2201

Application Transaction (set up report)
Sales Revenue (set up report)
Sales (set up report)
Revenue per Session (set up report)

Technical Reports:

Log Activity (set up report)
Alerts & Notification (set up report)

2200

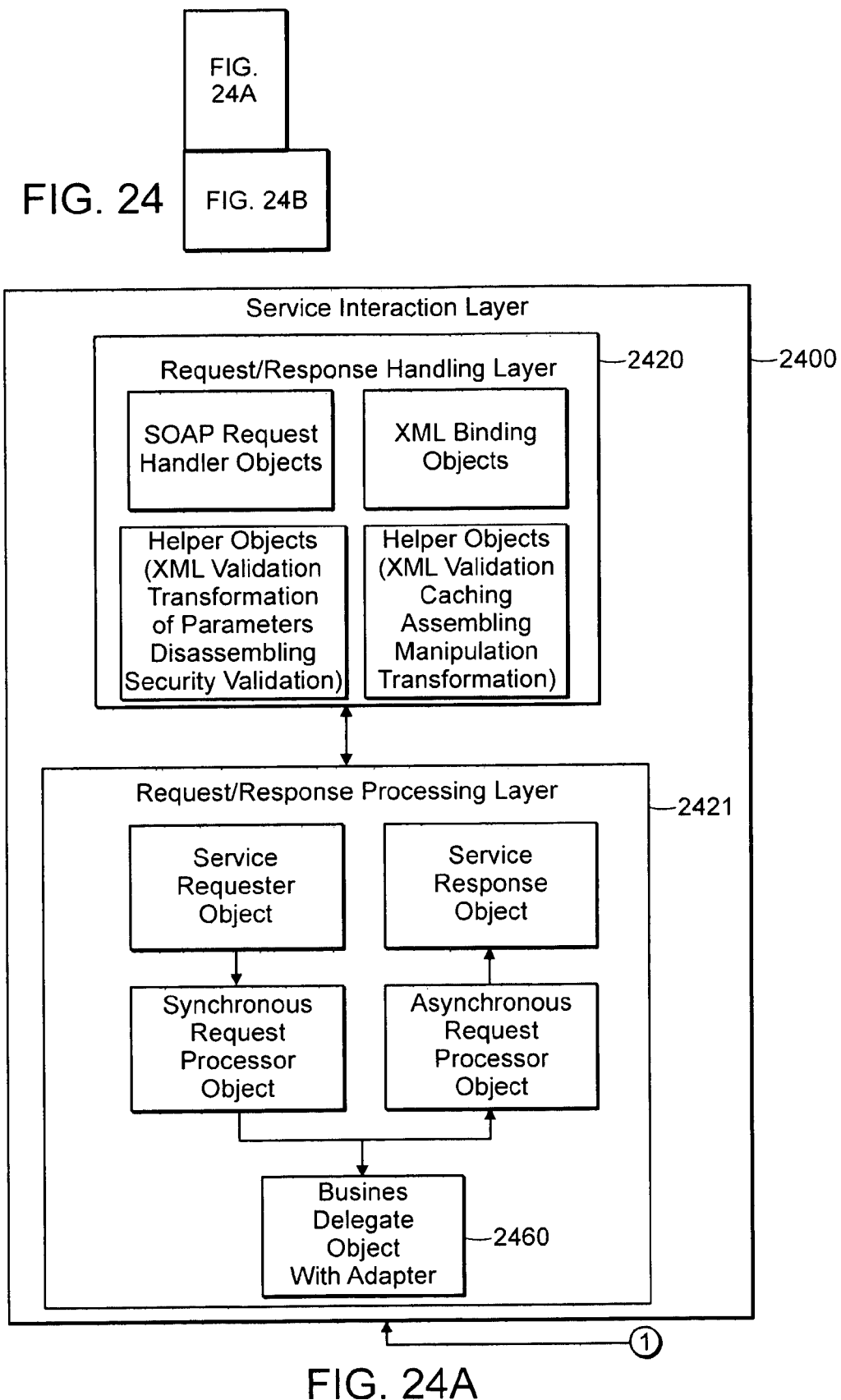

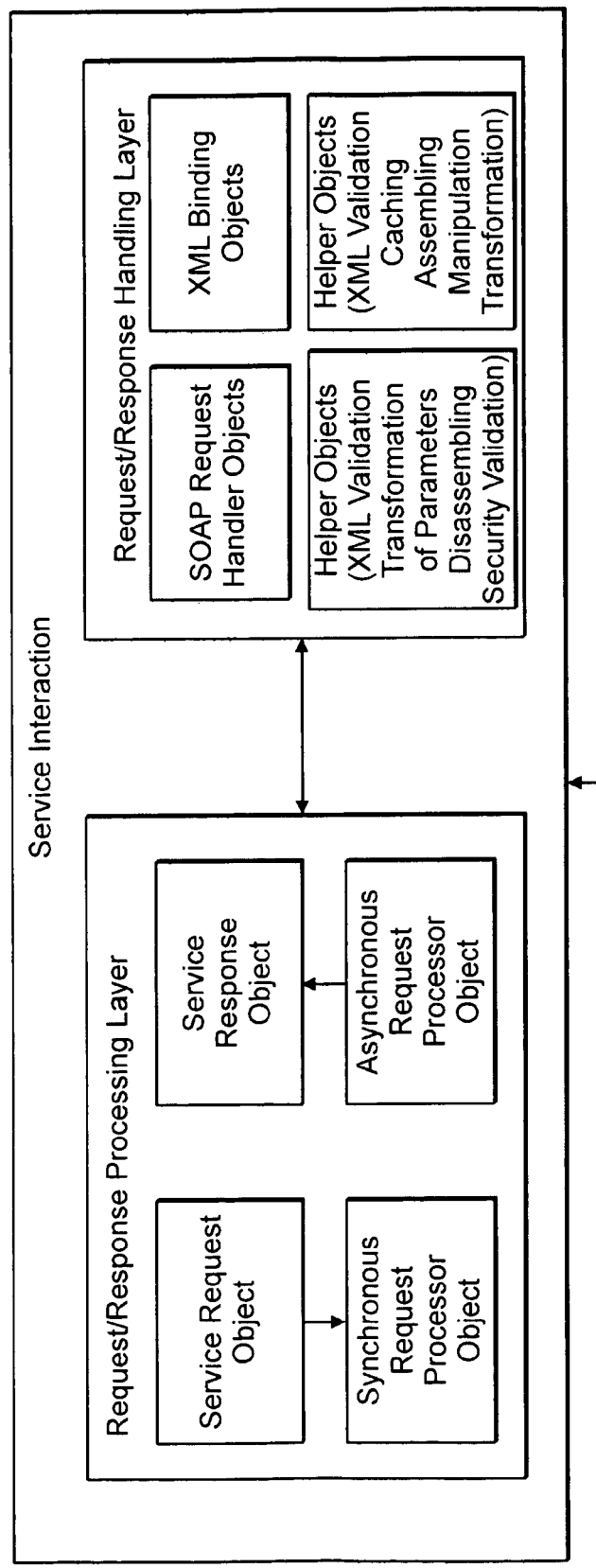

APPARATUS AND METHOD FOR MANAGING A NETWORK OF INTELLIGENT DEVICES

PRIORITY

The present application claims priority from U.S. Provisional Patent Application Ser. No. 60/672,202 filed on Apr. 15, 2005 entitled "Apparatus and Method for Managing a Network of Devices Using a Device-Independent Interface," which is incorporated herein by reference in its entirety.

TECHNICAL FIELD AND BACKGROUND ART

The present invention relates to managing devices in a network and more specifically to managing devices using a device-independent communication interface. In the prior art, client/server systems have been designed for reporting about the state of devices within a network, however these systems have been limited in that they are device-dependent, requiring all devices to run the same operating system (Linux, Windows, etc.) and execute the same language code or object model. These reporting systems employ the standard three-layer application architecture (data layer, business logic layer, presentation layer). This three-layer architecture does not separate out system dependencies from the business logic layer and therefore, the three-layer architecture does not provide reusability to different device types.

Additionally, these systems are designed only for reporting and not for remote management, configuration, self-healing, and content management. Therefore, the prior art systems do not support adaptive process automation.

SUMMARY OF THE INVENTION

In one embodiment of the invention a distributed platform for managing a network of devices using heterogeneous network addressable software components is disclosed. The platform allows for control tasks on a device that are performed in the real world under intelligent control. The platform includes a server component and a client component where the client component and server components involve logic that may be software, hardware or some combination thereof. Each device is associated with a client component. A device is capable of executing or interpreting logic of the client component. Examples of devices include computer terminals, kiosks, printers, robotic machinery, vending machines, stereo systems, sensors or any other machine that is capable of being connected directly or indirectly to a computer network. The device is connected to the network through the client component and directly communicates to the server over the network using the client component.

The platform provides a service-oriented architecture wherein the client component is configured to contact the server component on either a periodic basis or at the occurrence of an event using a device-independent protocol. Thus, the server may receive the status of a device, configuration information, or an alert as to an error condition about a device. The platform is based on providing a collection of services. A service exists as an independent process and has a well-defined, discrete function, providing a unique and clearly delineated responsibility. A service is associated with a communication protocol. The platform operates such that the server component receives a "request" from a service requester (client component), processes the request, and sends an appropriate "response" back to the client component associated with the device. The client component does not need to know how the request is processed or how the service is implemented. It only needs to know the request format and the results that are produced. This makes the platform modular and interoperable. Thus, the platform combines a service oriented architecture that provides for separation of the device dependencies and business logic allowing for reuse of the business logic with multiple devices. Further devices may be grouped together that share similar characteristics, but have disparate underlying communication protocols or operating systems.

The device can contain the client component which may include software (scripts, machine code) or hardware (sensors) for providing status/error information. In one embodiment, the client component of the platform is configured to attempt self-healing prior to reporting an error condition. Self healing may result by rebooting software on the device or running its script program. Additionally, there may be different levels of reporting, for example, if an error condition occurs over a period of time without resolution through self-healing, the device will contact the server which will send a message to a designated address of a user. The server could send an e-mail message to a technician. If the error persists, and this is communicated to the server, the server may be configured to contact a manager within the organization that controls the devices.

The server component includes a user interface for entering business rules. These business rules may be executed by the server, by the client component, or by a combination of the server and the client components. The business rules are sent to the client components that are associated with the devices when the client component requests the business rules from the server. There may be business rules associated with a unique device, a class of device, with multiple classes of devices or through some other determination of devices. The business rules are provided to a user through a user interface in terms of categories. The categories are device independent. Within each category are one or more actions that may be taken. Actions are device dependent. The server knows which actions are allowable for which devices and will only display the device for which the action may be taken. Associated with each device that is part of the platform is a profile that indicates the device's history (what has been sent to the device and what has been received from the device), rules that are applicable, configuration information, and for some devices the digital content that has been distributed from the server component to the device.

The client component associated with a device can both send and receive information from the server, allowing for the reporting of status and for the receiving of updates and configuration information. The server component provides the central location for content distribution, configuration data distribution, and for receiving data reports associated with each of the devices within the network.

The server component may include a plurality of modules, wherein each module may operate independently on a different computer, computer system, or network. The architecture for the modules supports deployment in a clustered environment to provide high availability through fault tolerance at all application layers including presentation, web services, business logic, data access and system services layers. J2EE standards are followed to take advantage of fault tolerance, load balancing and availability features offered by J2EE compliant application servers. Fault tolerance at the data access layer is supported by implementing a parallel database platform.

Communications between the client component and the server component may occur over different channels or on different networks depending on the communication message and the module of the server that is being communicated with. The division of communications between modules at the server provides for scalability, security, and no single point of failure. Communication is accomplished using protocols, such as SOAP, and XML over HTTP or HTTPS. By having the client make requests to the server through an Internet connection, the platform avoids communication issues due to firewalls. A direct communication and HTTP session is established by the client that allows for transfer of HTTP to the client even if behind a firewall. Thus, the client component can receive commands for execution and instructions within the SOAP protocol structure. Simple XML over HTTP is used for sending component status information to the server where as SOAP is utilized for more complex functionality such as sending attachments, digital content and reports.

The platform operates with known devices for which devices profiles have been created on the server component. The number and type of devices within the platform are known by the server and additional devices may only be added through the server component. The server component includes a module for the device profiles wherein the device profiles contain the characteristics of the device which are stored as meta-data. In one embodiment of the invention, the server will push configuration parameters to a device when the device comes on-line and is recognized as a licensed device. The device will have an associated client component that will configure the device upon receipt of the configuration information from the server. Thus, the client component does not need to be manually configured.

The user interface of the platform allows for customization of business rules, such that a user may select error parameters, reporting characteristics, or self healing characteristics for a single device, a group of devices or for all devices. This information is stored in the device profile and will be distributed when the client component associated with a device connects with the server. The user interface is structured in terms of both dialog boxes and pull down menus that allow for the creation of the customized business rules. Business rules such as reporting and self-healing that are defined through use of the user interface are provided to and executed by the client. Other rules, such as, sending out communications based upon error reports to targeted individuals are implemented by the server. The business rules can be divided into five classifications, error handling, alerts and notifications, scheduled reports, and scheduled maintenance. The user interface can be accessed from any computer/device that is capable of making an Internet connection and displaying a browser window using HTTP/HTTPS. Thus, the user that is configuring the business rules that are stored on the server component does not need to be physically located at the server. Each screen/template that is provided to a user that is accessing the server component is based upon information that has been entered from a previous screen. For example, the user may configure or create business rules/error handling for an organized group based upon location of devices, type of devices, and configuration of devices, peripherals associated with the devices, or any other characteristic that is stored in the device profiles.

Thus, the user interface can be used to configure business rules and reports so that intelligent analysis can be made including tracking sales data and usage information concerning digital content or devices. The reports that are provided to the end user can be tailored to the end user's business role. Marketing information can be controlled and updated by marketing users, sales information can be monitored by sales managers, and error reports can be monitored by the service staff.

In accordance with one embodiment of the invention, a method of managing a network of intelligent devices in communication with a server is presented. The method includes for each device, establishing a client process associated with the device causing issuance of a query to the server for instructions. In controllable response to the query received at the server as a result of the client process, at least one of the following is caused: (1) downloading, for storage local to the device, at least one of data and instructions, for use in association with the device, and (2) uploading of data pertinent to the device.

In accordance with related embodiments of the invention, the method may include an interface in association with the server permitting establishment of a business rule governing management of operation of a selectable set of devices on the network. A business method download process running on the server may cause download of business instructions pertinent to the selectable set of devices, for storage local to each of the selectable set of devices that implement the business rule at the device level.

In accordance with another embodiment of the invention, a method for automatic configuration of an intelligent device in a network upon connection to the network is presented. The method includes configuring a server to accept queries associated with a device. A client process associated with the device is established causing issuance of a query to the server. The device is recognized at the server based at least on the query, causing issuance of configuration data to the device. A client process associated with the device is established for automatically configuring the device based upon the configuration data.

In accordance with another embodiment of the invention, a method for management of intelligent devices within a network is presented. The method includes receiving at a server a set of criteria including device characteristics defining an organized group of the networked intelligent devices. Membership of intelligent devices within the group is determined at the server based on a database containing characteristics of intelligent devices within the network. A signal to each member of the group is sent from the server providing each member with the set of criteria defining the group. A device update signal is received from any member of the group that has an update, for example to hardware or configuration, Thus, based upon the update signal the server automatically monitor an updated device's qualification for membership in the organized group.

In accordance with a related embodiment of the invention, a change to the criteria of the organized group may be received at the server. An update of group criteria is sent to each group member. A dropout signal is received from any member of the group ceasing to meet the updated criteria for group membership.

In accordance with further related embodiments of the invention, a signal sent to each member of the group may be received by a client associated with the intelligent device. The client may translate the signal into one or more instructions understood by the intelligent device.

In accordance with still further related embodiments of the invention, the method includes receiving at the server a request for organized group information from a networked device other than one of the intelligent devices. Information regarding the organized group is sent to the networked device. Each group may include an associated access level and based upon a received access level from the networked device, the server may determine if the networked device can receive group information. The associated access level may provide selective access to device characteristics. Device characteristics may include, for example: location, hardware model, software configuration, and device type. The change to the criteria of the group may be originated by a networked device.

In accordance with another embodiment of the invention, a system for managing networked intelligent devices in communication with a server is presented. The system includes for each networked intelligent device, a client process module for establishing a client process causing issuance of a query to the server. A server process module responsive to the query causes (1) downloading, for storage local to the device, data and/or instructions, for use in association with the intelligent device, and/or (2) uploading data pertinent to the device.

In accordance with related embodiments of the invention, an interface in association with the server process module may permit establishment of a business rule governing management of operation of a selectable set of intelligent devices on the network. A business method module on the server may download business instructions pertinent to a selectable set of devices, for storage local to each of the selectable set of intelligent devices that implement the business rule at a device level. The business method module may separate the business instructions from communication instructions between the client process module and the server process module.

In accordance with another embodiment of the invention, a system for management of intelligent devices within a network includes a receiver module located at a server. The receiver module receives a set of criteria including device characteristics defining an organized group of the networked intelligent devices. A group determination module located at the server determines membership of intelligent devices within the organized group based at least on a database containing characteristics of intelligent devices within the network. A communications module located at the client on each member of the group sends a signal to the server which updates the group membership. The receiver module receives an update signal from any member of the group having an update wherein the server determines whether the device is still a member of the group.

In accordance with related embodiments of the invention, the system includes an interface for receiving at the server a signal indicative of a change to the criteria of the group, wherein the communication module updates the group membership. The group determination module may update group affiliation based upon the update signal. The signal sent by the communication module to each member of the group may be received by a client associated with the intelligent device. The client may translate the signal into one or more instructions understood by the intelligent device.

In accordance with further related embodiments of the invention, an information module may receive a request for group information from a networked device other than one of the intelligent devices causing the communication module to send one or more group listings to the networked device. When the information module receives a request for group information from a networked device, a security module may determine an associated access level. Based upon the access level, the security module may determine if the networked device can receive information. The security module may use a user profile to determine if a networked device can receive can receive information. The security module may determine if a user can change characteristics of the information.

In accordance with another embodiment of the invention, a computer program product for use on a computer system is presented for managing a network of intelligent devices in communication with a server. The computer program product includes a computer usable medium having a computer readable program thereon. The computer readable program code includes for each device, computer code establishing a client process associated with the device causing issuance of a query to the server for instructions. Furthermore, the computer readable program code includes computer code for causing, in controllable response to the query received at the server as a result of the client process, at least one of (1) downloading, for storage local to the device, at least one of data and instructions, for use in association with the device, and (2) uploading of data pertinent to the device.

In accordance with related embodiments of the invention, the computer readable program code may include computer code for an interface in association with the server permitting establishment of a business rule governing management of operation of a selectable set of devices on the network. Computer code for a business method download process running on the server may cause download of business instructions pertinent to the selectable set of devices, for storage local to each of the selectable set of devices that implement the business rule at the device level.

In accordance with another embodiment of the invention, a computer program product for use on a computer system is presented for automatic configuration of an intelligent device in a network upon connection to the network. The computer program product includes a computer usable medium having a computer readable program thereon. The computer readable program code includes: computer code for configuring a server to accept queries associated with a device; computer code for establishing a client process associated with the device causing issuance of a query to the server; computer code for recognizing the device at the server based at least on the query causing issuance of configuration data to the device; and computer code for establishing a client process associated with the device for automatically configuring the device based upon the configuration data.

In accordance with an additional embodiment of the invention, a computer program product for use on a computer system is presented for management of intelligent devices within a network. The computer program product includes a computer usable medium having a computer readable program thereon. The computer readable program code includes computer code for receiving at a server a set of criteria including device characteristics defining an organized group of the networked intelligent devices. The computer readable program code further includes computer code for determining at the server membership of intelligent devices within the group based on a database containing characteristics of intelligent devices within the network. Additionally, the computer readable program code includes computer code for sending from the server a signal to each member of the group identifying each member as belonging to the group. In one embodiment, each member of the group is provided with the set of criteria defining the group. In some embodiments, the computer program product includes computer code for receiving a dropout signal from any member of the group ceasing to meet the criteria for membership. In another embodiment, the intelligent device sends an update signal to the server wherein computer code at the server determines whether the updated device is still a member of the group. The intelligent devices may thus automatically monitor their qualification for membership in the organized group.

In accordance with related embodiments of the invention, the computer program product may further include 1) computer code for receiving at the server a change to the criteria of the organized group, 2) computer code for sending an update of group criteria to each group member, and 3) computer code for receiving a dropout signal from any member of the group ceasing to meet the updated criteria for group membership.

In accordance with further related embodiments of the invention, the computer program product may further include computer code for receiving, by a client associated with the intelligent device, the signal sent to each member of the group. The computer program product may further include computer code for translating, at the client, the signal into one or more instructions understood by the intelligent device.

In accordance with still further related embodiments of the invention, the computer program product may include 1) program code for receiving at the server a request for organized group information from a networked device other than one of the intelligent devices, and 2) program code for sending information regarding the organized group to the networked device. Each group may include an associated access level, the computer program product further comprising computer code for determining, at the server, if the networked device can receive group information. The associated access level may provide selective access to device characteristics. The device characteristics may include location, hardware model, software configuration, and device type. The computer program product ma further comprising computer code at a networked device for sending the change to the criteria of the group.

BRIEF DESCRIPTION OF THE DRAWINGS

The foregoing features of the invention will be more readily understood by reference to the following detailed description, taken with reference to the accompanying drawings, in which:

FIG. 2 is a block diagram showing the autonomous services and the communication between the client component and the server component;

FIG. 5 shows the layers that are applicable to the server;

FIG. 6 shows the layers that are applicable to the client;

FIGS. 8-23 show screen shots of the user interface for creating business/error rules, organized groups, viewing device profiles and creating reports;

FIG. 8 shows a screen shot of a master screen including a task bar;

FIG. 8A shows a screen shot for creation of an intelligent device profile;

FIG. 8B shows a screen shot for creation of an organized group of intelligent devices;

FIG. 8C is a diagram showing the relationship between business rules, device profiles, and organized groups;

FIGS. 9-15 show screen shots for the creation of a business rule for error handling;

FIG. 16 shows a device profile view;

FIG. 17 shows a device history view;

FIGS. 18-21 show screen shots for creation of a business rule for content distribution;

FIGS. 22-23 show screen shots for generating reports;

DETAILED DESCRIPTION OF SPECIFIC EMBODIMENTS

Definitions

Figure 1:
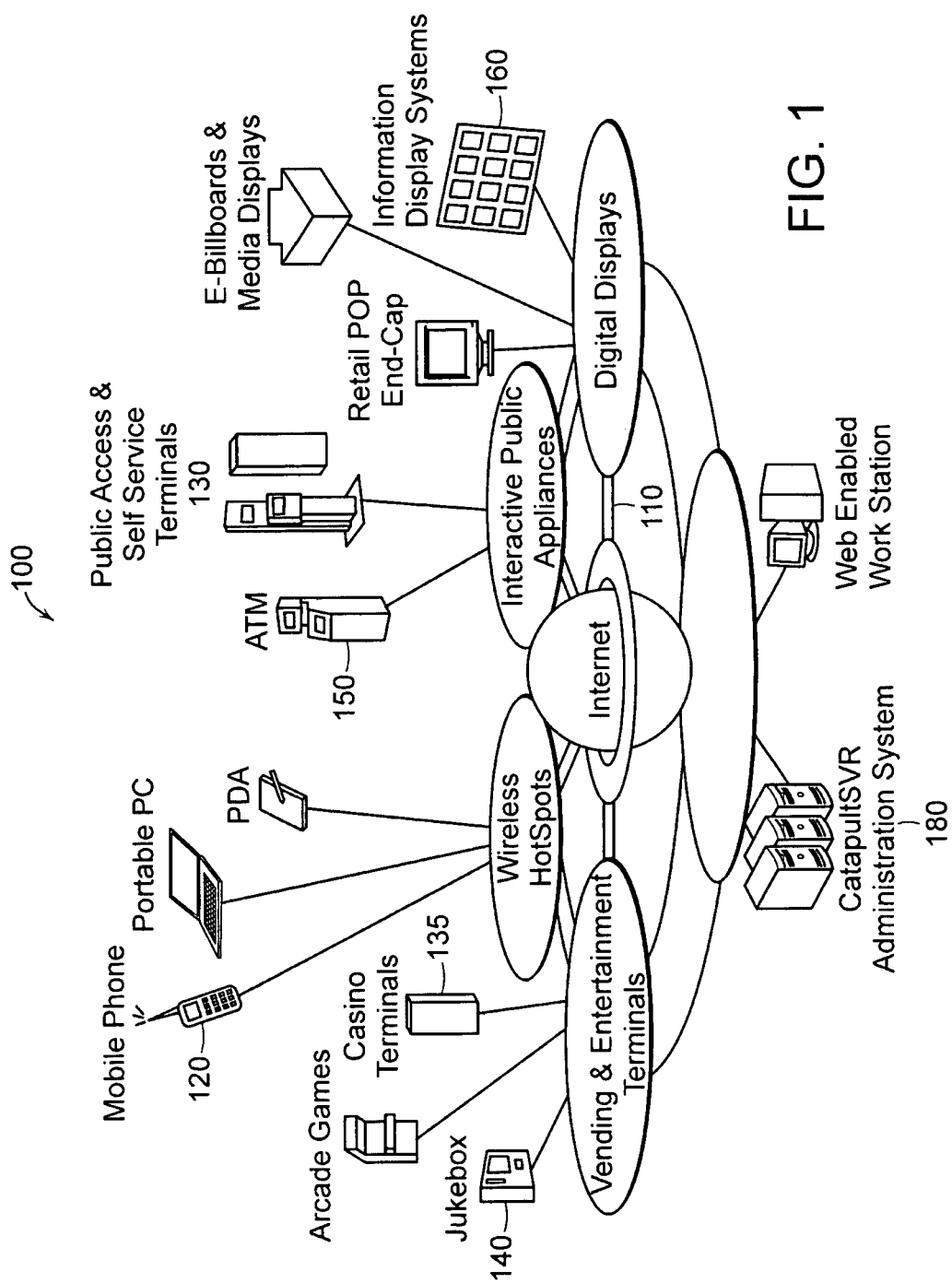
FIG. 1 shows a platform for managing networked devices using a device independent interface.

As used in this description and the accompanying claims, the following terms shall have the meanings indicated, unless the context otherwise requires: The term "Hypertext Transfer Protocol" ("HTTP") shall refer to an application level protocol that provides a set of rules for exchanges between a browser and a server. It provides for the transfer of information such as hypertext and hypermedia, and for the recognition of file types. The HTTP protocol is at a higher level than the transfer layer protocol such as TCP/IP. HTTP provides stateless transactions between client and server. The term "Simple Object Access Protocol" ("SOAP") shall refer to a protocol for exchange of information in a decentralized, distributed environment. It is an XML based protocol that consists of three parts: 1. an envelope that defines a framework for describing what is in a message and how to process it, 2. a set of encoding rules for expressing instances of application-defined data types, and 3. a convention for representing remote procedure calls and responses. SOAP allows a program running in one kind of operating system (such as Windows 2000) to communicate with a program in the same or another kind of an operating system (such as Linux) by using the World Wide Web's Hypertext Transfer Protocol (HTTP) and its Extensible Markup Language (XML) as the mechanisms for information exchange. SOAP runs over the existing Internet infrastructure without being tied to any operating system, language, or object model. As used in this specification, the term "platform" refers to the system including server components and client components that are associated with devices. A "component" can be either software, hardware or some combination of the two. A component can be composed of many different modules. A "module" is a block of logic, such as an object in an object-oriented computer language that is designed to perform a specific task. The term "intelligent device" refers to an apparatus specially designed to perform a dedicated task other than computation or textual printing and in addition has an associated controller and memory for monitoring the dedicated task. The controller and memory may be internal or external to the intelligent device. A network of intelligent devices is distinct from a network of computers. The terms "properties," "characteristics" and "attributes" shall be used synonymously within the description and the accompanying claims. The term "metadata" shall refer to data about other data concerning the devices, including how, when and where the data is created, accessed, modified and deleted. For example, meta-data may be data about the properties, characteristics, and attributes of a device. The term "space" shall refer to a physical memory location where task entries and their result entries are stored on the client. A task entry contains information about the task that the client needs to execute and any other information that is required to execute that specific task. A result entry contains information about the result of the execution of a particular task including the output of the execution of the task.

FIG. 1 shows a platform 100 for managing networked intelligent devices using a device independent interface. The network 110 can be either a wired or wireless network. The intelligent devices that are shown include mobile phones 120, casino terminals 130, jukeboxes 140, ATM machines 150, information display systems 160 and PDAs 170. The platform includes a server component 180 and a client component (not shown). Each device has an associated client component that is in communication with the device. The client component can be, but is not necessarily part of the intelligent device. The platform 110 is designed for business management of intelligent devices 120-170 wherein the devices can provide status information, receive service configuration, receive distributed content, and send error information to the server component using the client component. In the platform, the client component contacts the server 180 and requests instructions over a network connection 110. Substantially all communications originate from the client side. The server component 180 includes a queue for receiving requests from multiple client components.

Figure 1A:
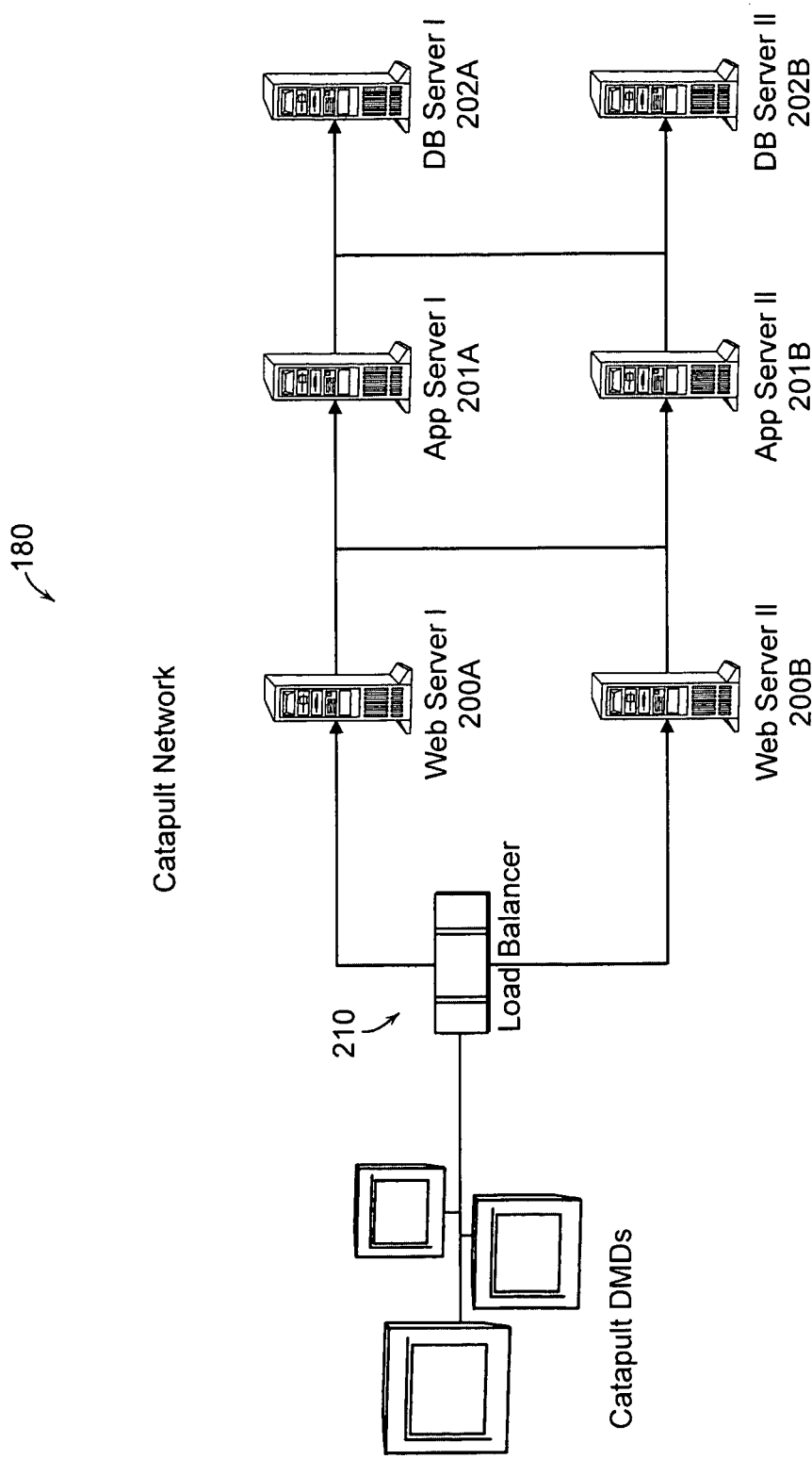
FIG. 1A is a block diagram showing the platform in a clustered and distributed environment.

FIG. 1A is a block diagram showing the platform in a clustered and distributed environment. The server component 180, as shown in this embodiment is composed of three servers: a web server 200A, 200B, an application server 201A, 201B, and a database server 202A, 202B. Each server is provided on a separate computer to distribute the processing as requests are made by the client components associated with the devices. Given that there may be hundreds or even thousands of devices within a platform, the platform is designed so that the server component can be clustered. Thus, there are redundant servers so that a load balancer 210 can direct requests to an appropriate server (200-202) based upon processing bandwidth. As shown there is a redundancy between each server (web server, application server, and database server). In some embodiments, the modules of the server component may be subdivided and can operate independently on separate servers. Additionally, each service could have its own server and the server could be located locally or remotely on the same or on a different network.

FIG. 2 is a block diagram showing the autonomous services and the communication between the client component 220 and the server component 230. The platform is a service-oriented architecture for distributing services to the devices by way of the client components 220 and server components 230. A service exists as an independent process and has a well-defined, discrete function, providing a unique and clearly delineated responsibility. Each service is associated with its own protocol. A service is defined by one or more modules or objects that make up the service. Communications for services are originated by the client components associated with the device. The implementation details of a service are encapsulated from the devices. Therefore, the services may be reused among many different types of devices. Further, the services themselves are kept as separate entities and therefore, changes to the implementation of a service do not impact other services.

FIG. 2 shows an example wherein there are three separate services. The first is content distribution 240. A device may be capable of displaying content to a user of the device and the client component can make a request to the server component for receiving either new or updated content. For example, the device may be a music station located at a record store wherein new music is requested by the client component 220 and the server component 230 sends the new music to the device. In certain embodiments, the server component can apply business rules and determine the content to be distributed to the device. For example, a business rule may be created to send only classical content to a music station in the classical music section of a music store.

Because the services are autonomous, the services and the modules for supporting those services can be distributed among multiple computers, computer systems, or networks. In addition, to the content distribution, FIG. 2 shows two additional services: the configuration service 250 and device status service 260. Again, communication is initiated by the client component, which sends the device status or requests configuration updates. Because of the separation between services, if one module fails within the system, a service may be disrupted, but the entire platform will not fail.

Figure 3A:
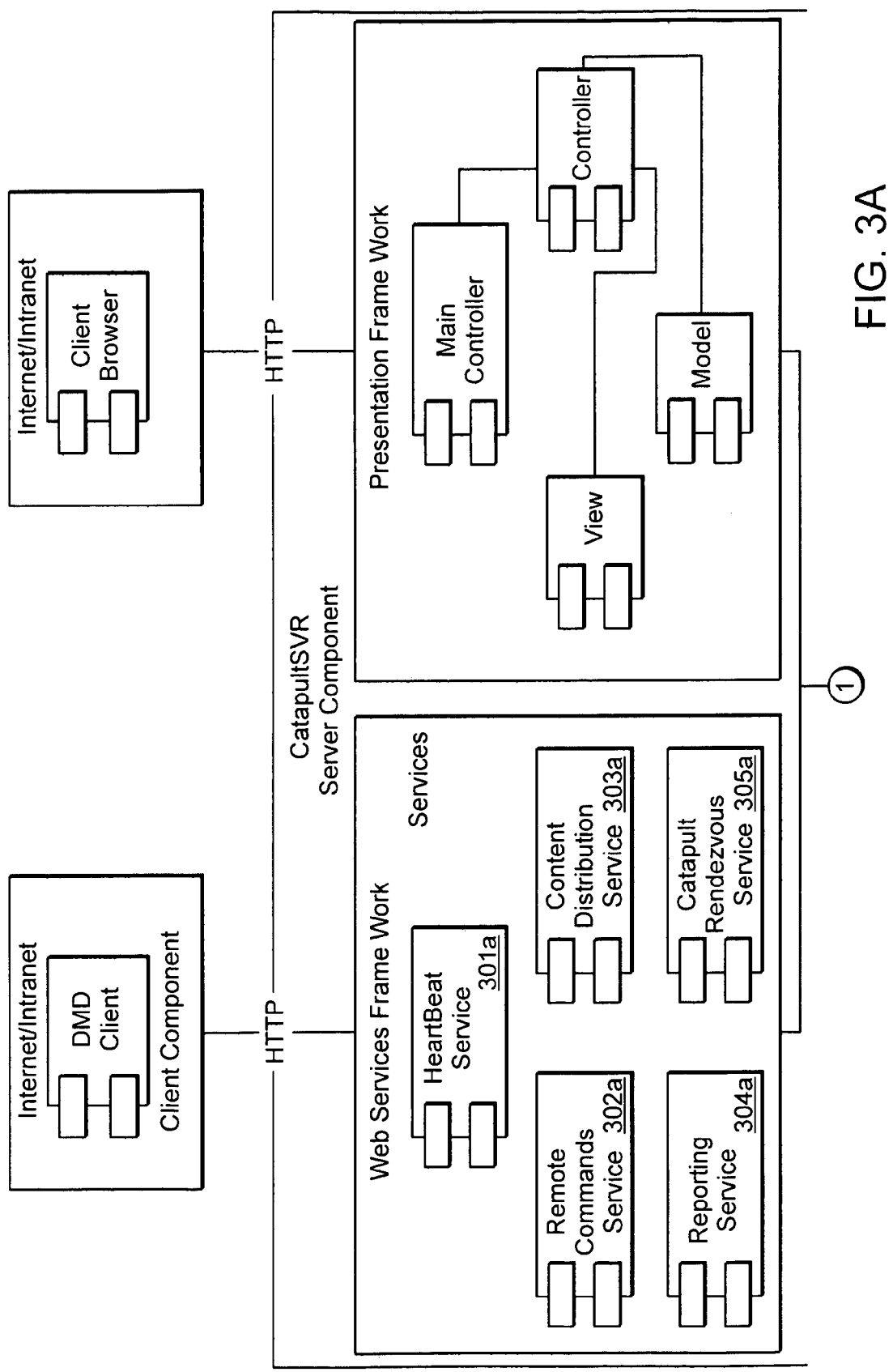
FIG. 3 is block diagram showing the services and modules that are part of the server component.
Figure 3B:
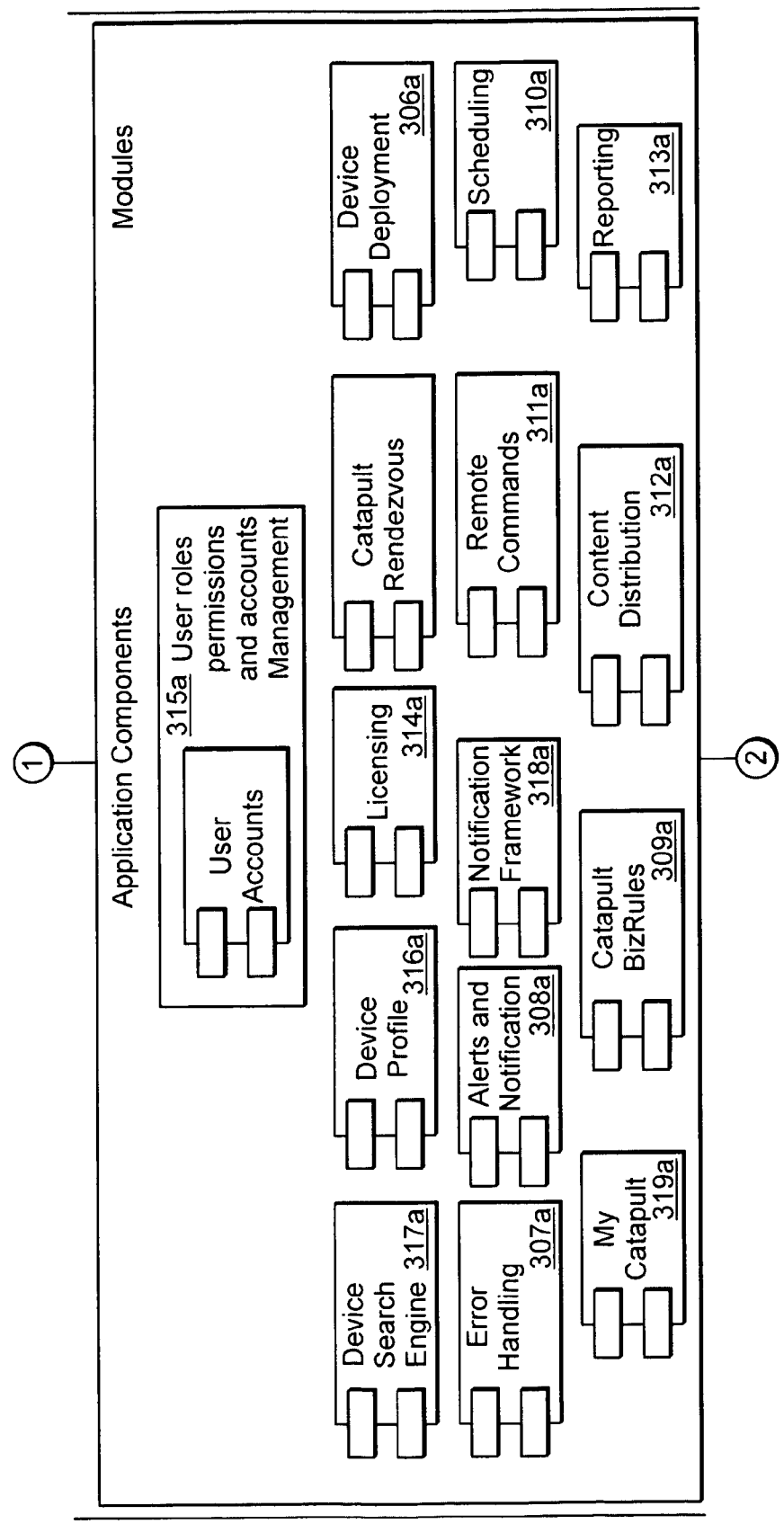
Figure 3C:
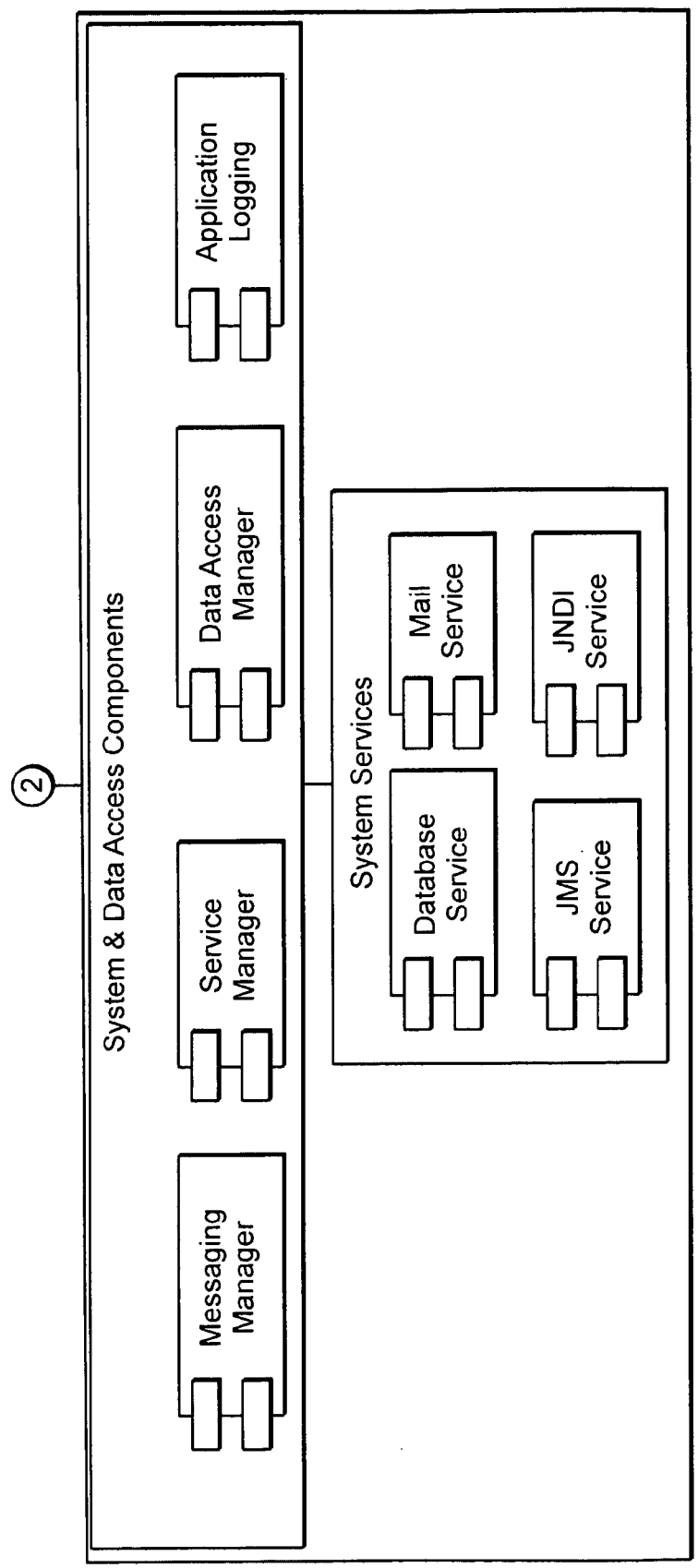
Figure 4B:
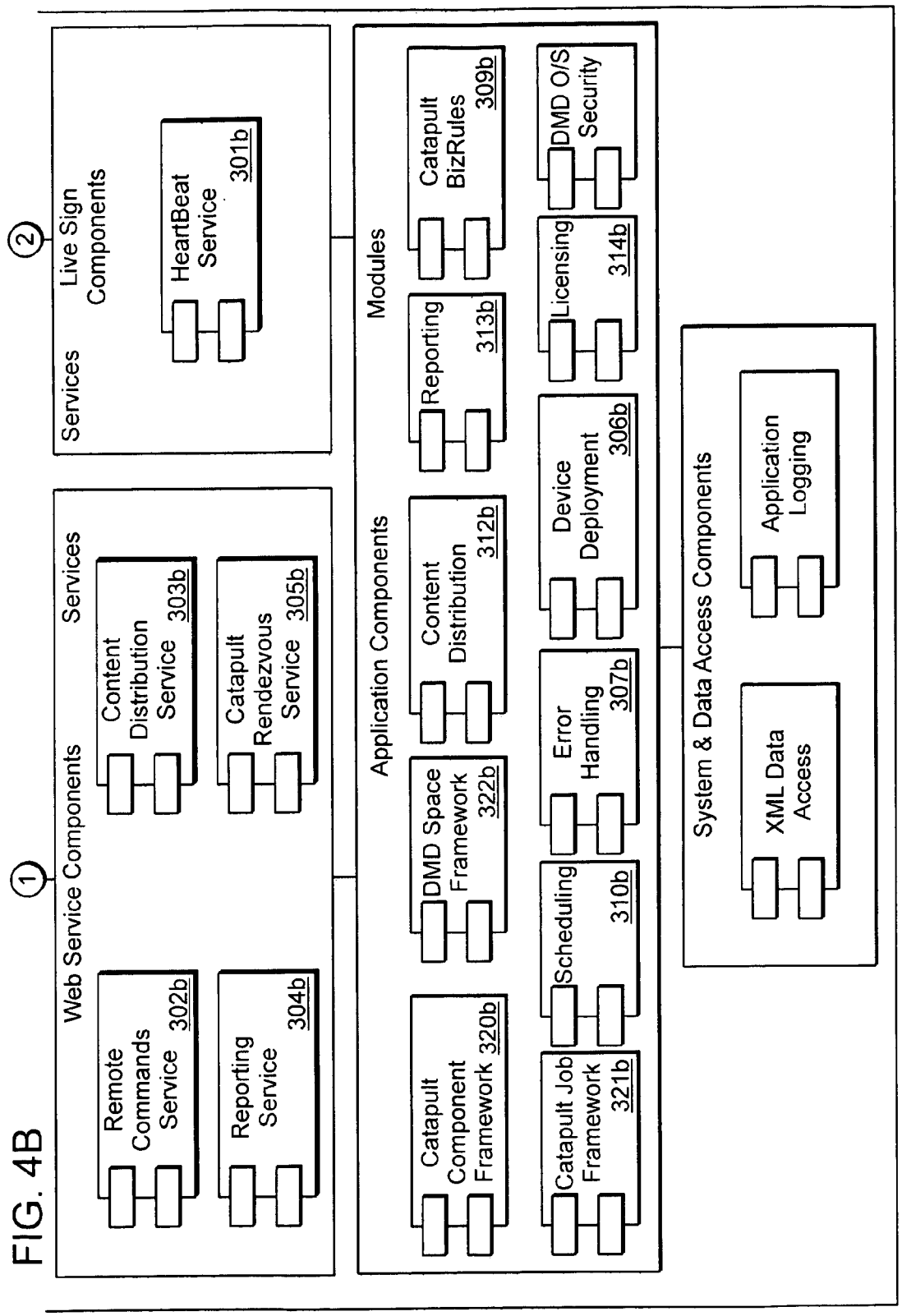
FIG. 4 is a block diagram showing the services and modules that are part of the client component.

FIGS. 3 and 4 show the internal modules that operate within the server component and the client component respectively to implement services. There are five distributed services which may use one or more associated modules: a heartbeat service 301a, b, a remote commands service 302a, b, content services 303a, b, a reporting service 304a, b, and a rendezvous service 305a, b. The platform divides the modules for the services into three types. The first is distributed modules that are distributed between the server and the client. Distributed modules allow for communication between the client and the server and for distribution of services. The second module type is a server-side module. The server component modules operate exclusively on the server. The third module type is a client component only. The client component modules exist solely within the client component and interface with the device.

With respect to FIGS. 3 and 4, the distributed services and modules will now be discussed. Elements denoted with an "a" refer to client side modules/services and elements denoted with a "b" refer to server side modules/services. Elements referenced herein without a designation for FIGS. 3 and 4 reference both the server and corresponding client modules/services. The heartbeat service 301 is a complete self contained web service that provides infrastructure and ways and means of sending device status and device health information from the client to the server. This web service uses the Simple XML over HTTP or REST for communication and data exchange.

The remote commands service 302 is a web service that enables the system capability of sending remote commands to the clients from the server. It allows users using the server user interface to execute OS level operations locally on the remote client. It uses SOAP for communication.

The content service 303 is a web service that uses SOAP for communication. It enables content distribution including content distribution parameters such as scheduling and activation information from server to client.

The reporting service 304 enables the reporting capabilities of the platform. It allows clients to send their reporting data including business data and service logs to the server for reporting and analysis. It provides a standard means of generating the reporting data and transferring it using SOAP.

The rendezvous service 305 provides the capability needed by the platform to manage and distribute configuration data including metadata and licensing information between clients and the server. This infrastructure provides a standard way of performing synchronization of data on the platform and device configuration including device properties, error handling and business rules. This service also interacts on the server with the rendezvous module 305 and detects any configuration or business rules and provides the interface for changing the rules. The rendezvous service also interacts with the device deployment module 306b that manages device properties and metadata and device deployments information on the server and the client. The Error Handling module 307b works with the rendezvous service 305a and allows users to configure error handling business rules on the server and send the rules to the client. These rules include service provisioning and self remedy actions. The work flow of this module supports escalation and notification as well. This module provides the interface for configuring these rules. The rendezvous module 305a will distribute these rules using the rendezvous service and the catapult bizrules module will execute the rules on the client (See FIG. 4).

The alerts and notification module of the server component 308a allows configuring business rules for monitoring alerts on the system and send notifications to the appropriate destination for attention. This module provides the interface for configuring these rules. The rendezvous service will distribute these rules to the devices where the bizrules module 309b at the client component will execute these business rules.

The server's scheduling module 310a provides a common infrastructure for scheduling maintenance activities, service reports, business reports and content distribution and activation. The bizrules module 309a is responsible for executing all device monitoring business rules including error handling, alerts and notifications and scheduled actions. This business rules engine executes all business rules that the server and the client are responsible for executing them. The remote commands module 311a performs system level or OS level operations that the client component is capable of performing locally on the device. This module provides the infrastructure needed to enable this feature on the client and allow users to interact with it from the server.

The content distribution module 312a handles all aspects of content distribution on the system including content uploading, scheduling and activation. This module allows user to configure content distribution parameters on the server. It also executes all content distribution operations on the client including content installation and activation. It uses content service for distribution of content.

The reporting and analysis module 313a handles all aspects of reporting on the system including data manipulation and scheduling of reports on the server. This module allows user to configure reporting parameters on the server. It also executes all reporting operations on the client including reporting data generation. It uses reporting service for transferring of reporting data. The licensing module 314 manages all licensing aspects on the server including seats managements, communication with the licensing the server and monitoring and prohibition of seat replication. This module also generates licensing information on the client and sends it to the server using the rendezvous service. Each of the previously mentioned modules has both a client side and a server side implementation, since each of these modules communicates information between the server and the client side.

The server only modules will now be discussed and are represented in FIG. 3. The user accounts module 315a manages user accounts on the system including user roles and permissions. Permissions on the system are granular and allow user to create roles on the system based on low level access to functionalities and devices on the system. The device profile allows users to organize devices on the system based on their metadata to better describe devices and effectively manage them according to the enterprise business process. This is handled by the device profile module 316a. This module allows users to create service, content, and business profiles of devices on the system based on their metadata. Profiles can be used later by other services to enable these services to intelligently and effectively offer their service.

The device search engine 317a enables the searching and filtering capabilities of the system. This engine allows users to search the system for devices based on their metadata and error conditions. It also offers a general search capability to allow users to search within sections and lists of items to make the user interface more usable and functional.

The server also includes a notification framework 318a. The notification framework 318a allows for creating custom notification actions on the server and integrating them into the work flow and business process of the alerts and notifications and error handling on the server. This facilitates integration with external enterprise systems and provides infrastructure for enterprise application integration (EAI) including customer relation management (CRM) systems, help desk and support systems and legacy systems.

My Catapult module 319a provides a personalized dashboard view of the system based on user's most frequent actions and behavior on the system as well as user's preferences. My Catapult includes components from reporting and analysis, alerts and troubled devices, user accounts, content distribution as well as quick links and favorites.

The client only modules are shown in FIG. 4 and include the component framework. The component framework 320b provides the infrastructure for adding and customizing client components such as application programs and hardware components. This module enables the remote management capability of these components and provides a standard interface for configuring these components using the rendezvous service. The job framework 321b provides an interface to implement specific business process and integrate it into the client component. The space framework 322b manages the memory for the tasks and results of jobs execution on the client. It stores entries that encapsulate business logic and processes. The space framework provides synchronous access to entries in the space, as requested on ad-hoc or scheduled basis and processes the entries in parallel returning the results into the space as result objects.

Figure 5:
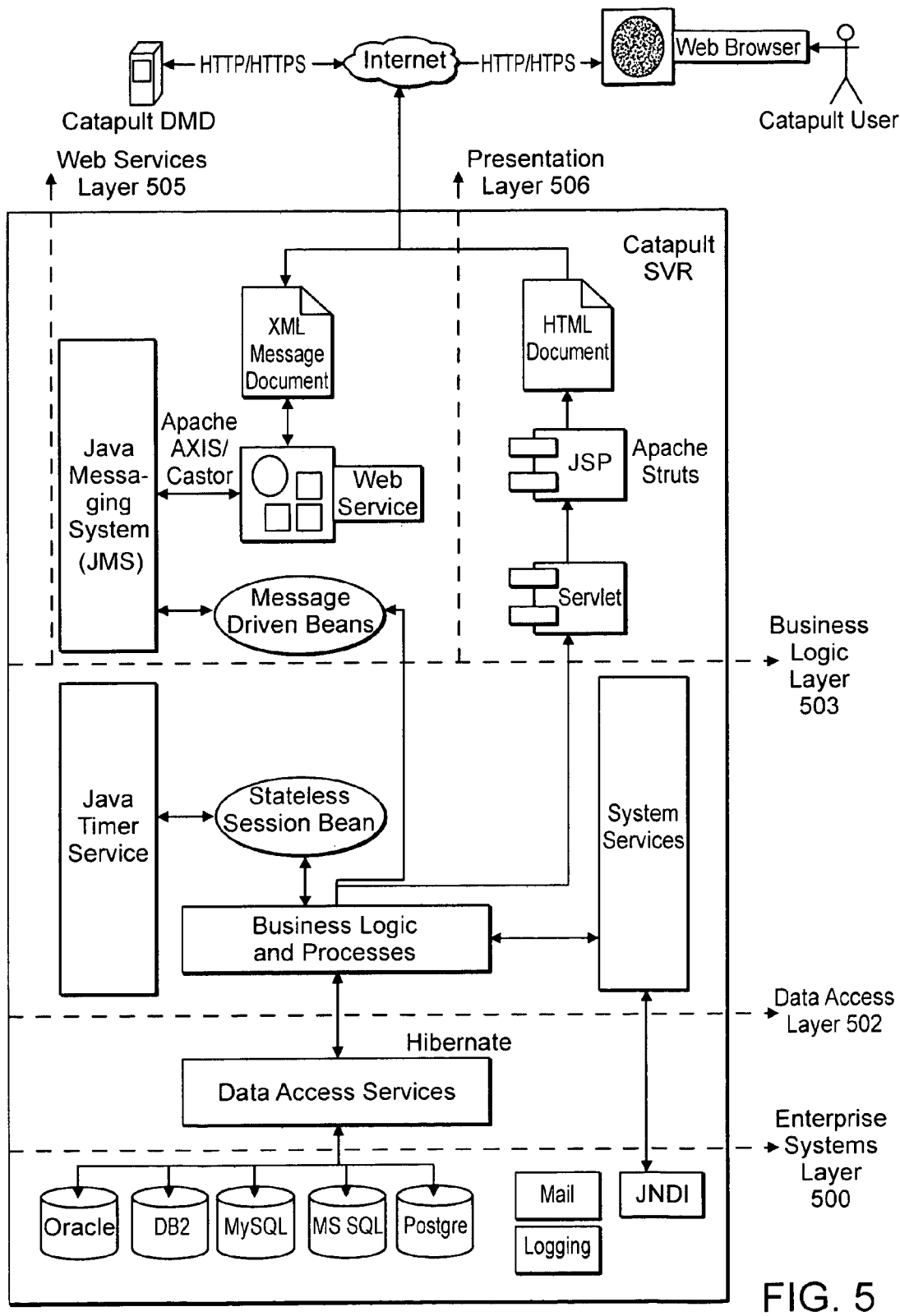
FIGS. 5 and 6 are logical connection diagrams that show a seven-layer application architecture for the client and server.
Figure 6:
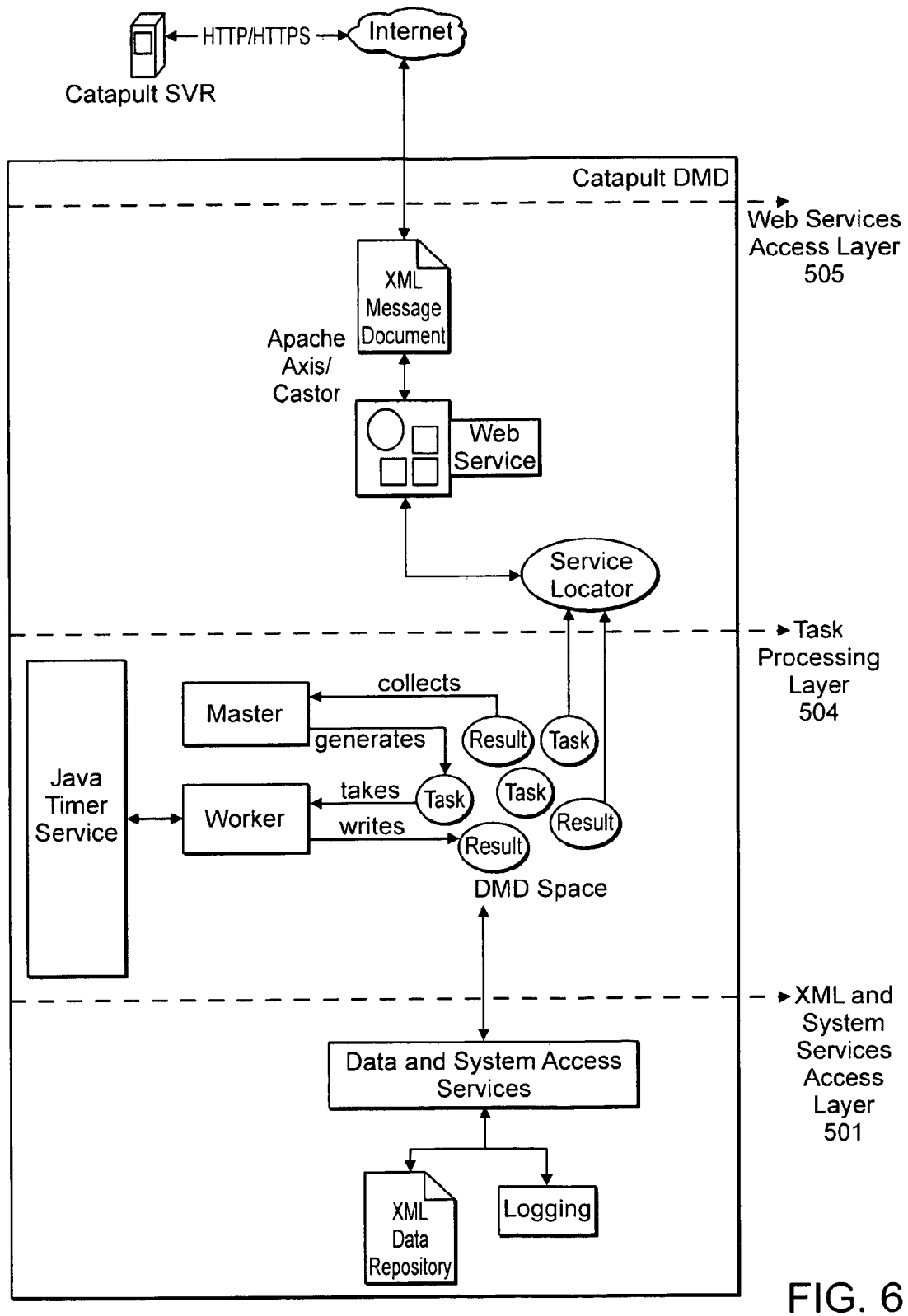

FIGS. 5 and 6 are logical connection diagrams that show a seven-layer application architecture for the client and server. The seven layer architecture permits reusability since the service-specific modules are isolated from the data and system access modules. Thus, the business logic is device independent and can be reused for different types of devices.

FIG. 5 shows the layers that are applicable to the server and FIG. 6 shows the layers that are applicable to the client. The seven layers are: Enterprise Systems 500, System Services Access 501, Data Access 502, Business Logic 503, Web Service 505, Presentation 506, and Task Processing layer (located on the client). Separating the platform into these layers allows for the layers to remain device/operating system independent. In addition, this separation reduces implementation complexity and increases stability of the product.

The presentation layer 506 is responsible for providing UI (user interface) services for the specific application and managing user interaction. The layer separation enables quick alteration of the look of user interface to meet renewed user demands and business needs without impact on the rest of application. The presentation layer 506 may produce HTML pages for a Web application or WML pages for a wireless application by using the same business process flow services, core services, and data access services.

The Web Service Layer 505 allows easy integration of Web Services in the application. This layer contains all service end point interfaces and processes client service requests. It provides common functionality for data binding and accessing the core application functionality between the server and the clients. This layer isolates the XML message data so that the application business logic is independent of the communication.

The message layer provides a message-oriented middleware (MOM) infrastructure, which allows for looser coupling within distributed systems by abstracting translation, security, and the underlying communications protocols from clients and servers. This layer is also used by the Web Services layer 505 as an Enterprise Message Bus to allow for asynchronous communication between the client and the server using SOAP (Simple Object Access Protocol) and XML based messages. This layer utilizes Java Messaging System JMS and Enterprise Message Driven Beans.

The business logic/workflow layer 503 is responsible for providing business process services. These components coordinate multiple core functional services based on given business rules. Separating business process flow logic from the core services enables the reusability of these services.

The data access layer 502 same as framework/system and data access components on FIG. 3 provides common data access services for the application components regardless of where or how the data is stored. This layer separation isolates the data underneath so that application data can be stored in many different database platforms. Thus, changes to the application data only affect the data access layer. This isolates the underlying data structure as well as the connection details and manages the data persistence.

The system services layer 501 same as system services FIG. 3 provides standard services to applications. These services include component naming and objects lookup. Security and directory services are also considered system services. For example, security and directory services may be leveraged throughout an application. Some services, like session management, may be contained only in the presentation layer.

Enterprise Systems layer 500 is responsible for providing services such as data storage, Java Messaging System (JMS) and mail. The data layer 502 is responsible for providing physical data storage. The data may be stored in multiple relational databases and/or legacy systems. The platform supports multiple database structures including Oracle, MS SQL, DB2, MySQL and Postgre. Multiple database support is made available through using JDBC and Hibernate.

The Web Services Access Layer 505 provides common interfaces for accessing web services. The interface is the starting point of a client's interaction with the service. This layer also handles other responsibilities, such as sending client requests and receiving server responses as well as service locating. This layer also handles the mapping of the XML documents to equivalent object representations in the web service access layer before delegating the request to the business logic.

The Task processing layer 504 holds all business logic encapsulated in Task and Result objects stored in the space. It provides the infrastructure for managing space entries and executing the required business processes wherein the Master object generates a request for a Task and the results are written in and retrievable from a Result object.

Figure 7:
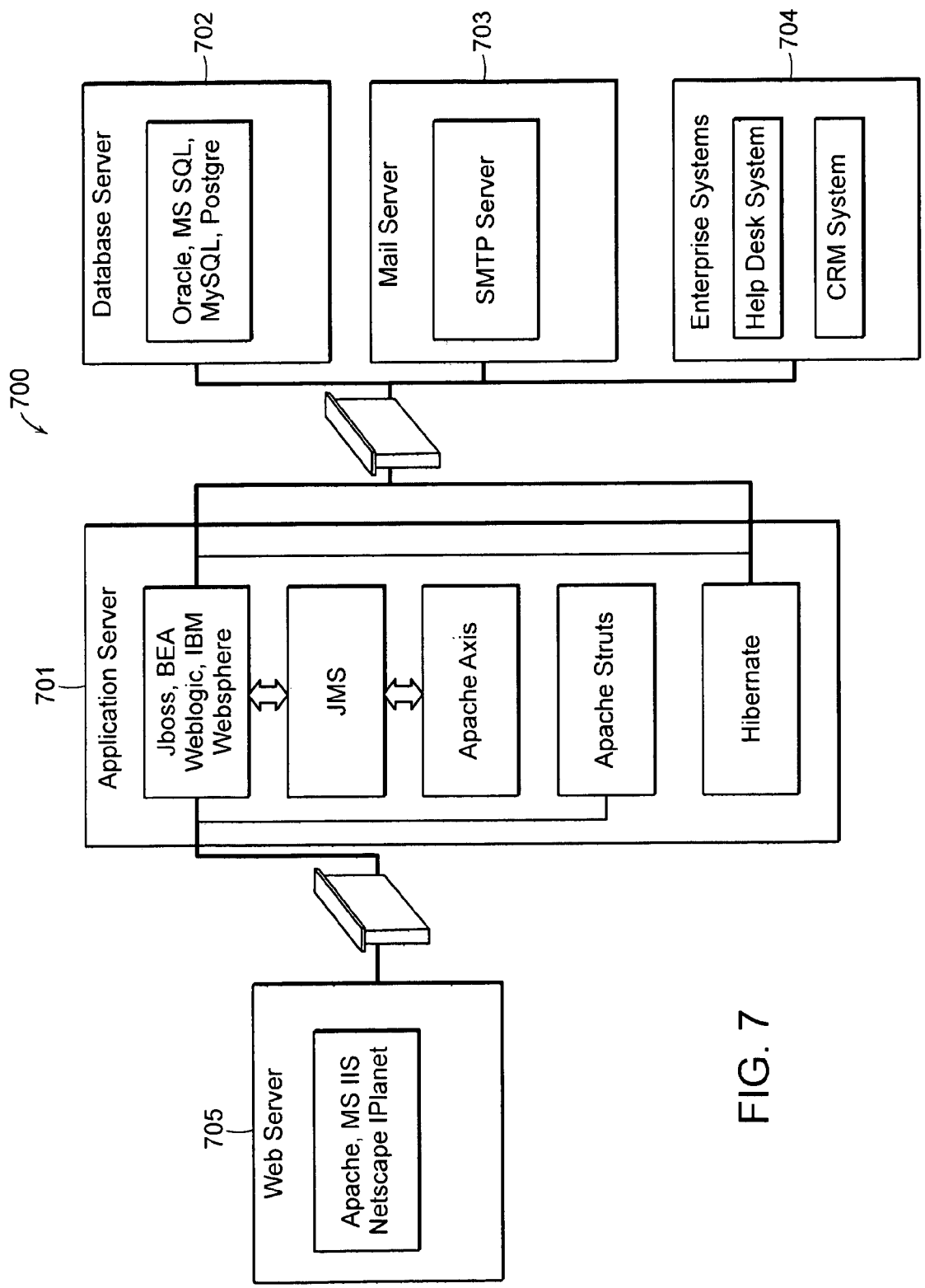
FIG. 7 shows a block diagram of the physical view of the platform. The physical view describes the mapping of the software onto the hardware and shows the system's distributed aspects.

FIG. 7 shows a block diagram of the physical view of the server platform 700. The physical view describes the mapping of the software onto the hardware and shows the system's distributed aspects of the server side. FIG. 7 graphically represents how applications are deployed against the physical server configuration, and their major interactions with each other. Thus, the web services 705, application services 701, databases 702, mail servers 703 and enterprise systems 704 are either physically or logically separated. Redundancy within the system is handled by adding redundant hardware and configuring a clustered environment. The environment includes session replication and transaction management.

Fault tolerance is handled by implementing a clustered environment. Application servers 701 will handle the low level implementation of the fault tolerance and fail safe over in case one of the servers fails.

The platform can be scaled by adding more hardware in a cluster configuration at the server side. The application sever 701 will handle the details of distributing load between the different nodes in the clustered environment.

Each of the devices that are part of the platform is first entered into the server component 700 creating a profile for the device and the accompanying client component. The client component is installed on the device or in conjunction with the device and upon initialization will contact the server component. The server component will identify the device and recognize that this is the first connection. The server component will automatically retrieve configuration information for the device and send the configuration information to the client component. After receiving the configuration information, the client component will set the configuration parameters for the device and the device will then be active and ready to use within the platform.

Figure 7A:
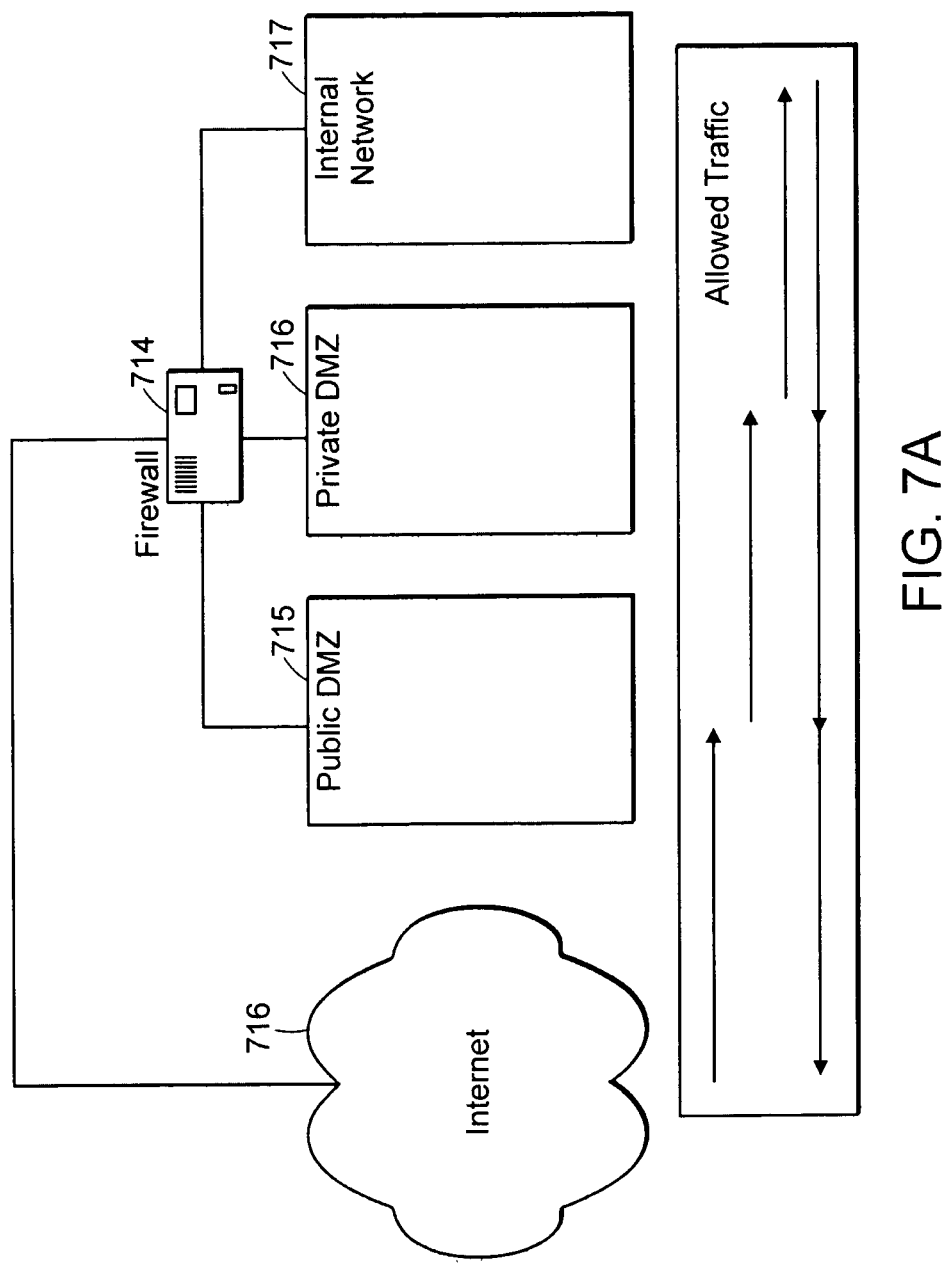
FIG. 7A is a model showing a security view of the platform at the network level.

FIG. 7A is a model showing a security view of the platform at the network level. As already stated, the services and modules may be deployed across multiple servers. A demilitarized zone is created by configuring firewalls. The public DMZ (demilitarized zone) 715 allows users to contact the platform through the Internet 716. Servers in the private DMZ 716 cannot be contacted directly by Internet based users and can only be contacted indirectly through a server in the public DMZ 715. As shown by the arrows, traffic into the server component is only allowed to pass from left to right. The public DMZ servers 715 can only pass requests/data to the private DMZ 716, and the private DMZ 716 can only pass requests/data to the internal network 717. Communication can be made from the internal network 717 to either the private DMZ 716 or the public DMZ 715 or even to the internet directly 715. Communication between servers is through port 80, which is the HTTP communication port. The modules of the server component 700 reside on the application server(s) 701 which should be located in a private network 716 in the DMZ. Other enterprise systems such as the SMTP server 703 and database server 702 should be located in the private network 716 in the DMZ area to be protected from unauthorized access using role-based security, user authentication, and encryption of sensitive data. Encryption of data traffic over the internet to and from the server component is done using the secure socket layer (SSL) protocol. In certain embodiments, traffic between the Web Server 705 and the SMTP Server 703 is only allowed through a predetermined port to perform mail operations. In embodiments, traffic between the web server 705 and the database server 702 is only allowed through a different predefined port to perform database transactions. The database server 702 contains data such as the device profiles and the user profiles. On top of the network and firewall security infrastructure, the application and database levels will be protected by the middle-tier. The middle-tier will use role-based security, user authentication and encryption.

FIGS. 8-23 are screen shots of the user interface that is associated with the server component. As shown in the figures, an arrowhead indicates the selected task. A user may select from: My catapult, devices, device profiles, rules, users, software updates, content packages, and reports. Since the application level protocol is HTTP using SOAP, the user interface may be accessed using an internet connection from anywhere. Thus, the user interface ("UI") may be accessed on the server itself or at a remote location using a web browser.

Figure 8:
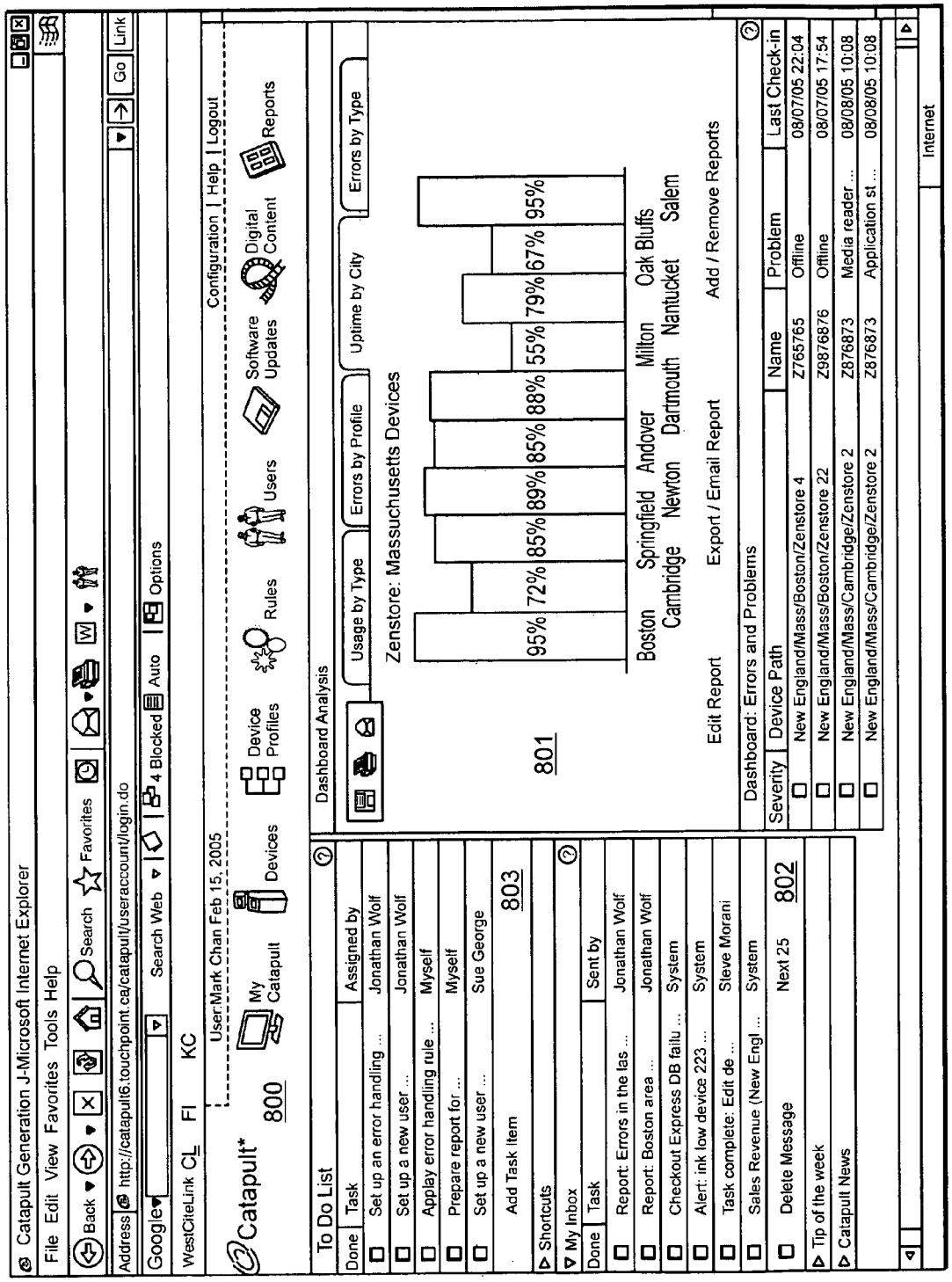

FIG. 8 shows a user status window (My Catapult) 800 that appears inside of a browser after a user logs into the server and validates his/her identity. The user status window shows To Do lists 803, messages in an Inbox 802, and any analysis 801 that has been performed. As shown in the analysis section 801, a report displaying the percentage of time for a given store for which all connected devices were functioning is shown.

In certain embodiments a user, can create a device configuration profile by accessing the device profile module 316a from FIG. 3. The device configuration profile indicates device attributes and may be reused, so that a user need not re-enter device attributes for a common device type. For example, a user can define a profile for a "Kiosk." The profile may include any metadata that can be used to describe the device, for example, attributes such as processor type, communication protocol, printing capability, and network connection. Thus, once the common attributes for a Kiosk profile are defined, that profile can be re-used for each subsequent Kiosk device. As shown in FIG. 8A, a user selects, the tab marked device profiles 800 as indicated by the arrow head. The user can then set up properties for the device profile. For example, the user can define a device profile for all devices located at a specific store 810 or in a specific city 820. The server automatically maintains the devices associated with the profiles. The server side of the platform automatically propagates changes to an existing profile definition to the devices associated with the profile. Similarly, if a user switches profile assignments or modifies profile attributes, the server will update or remove device associations depending on the capabilities of the device.

Figure 8B:
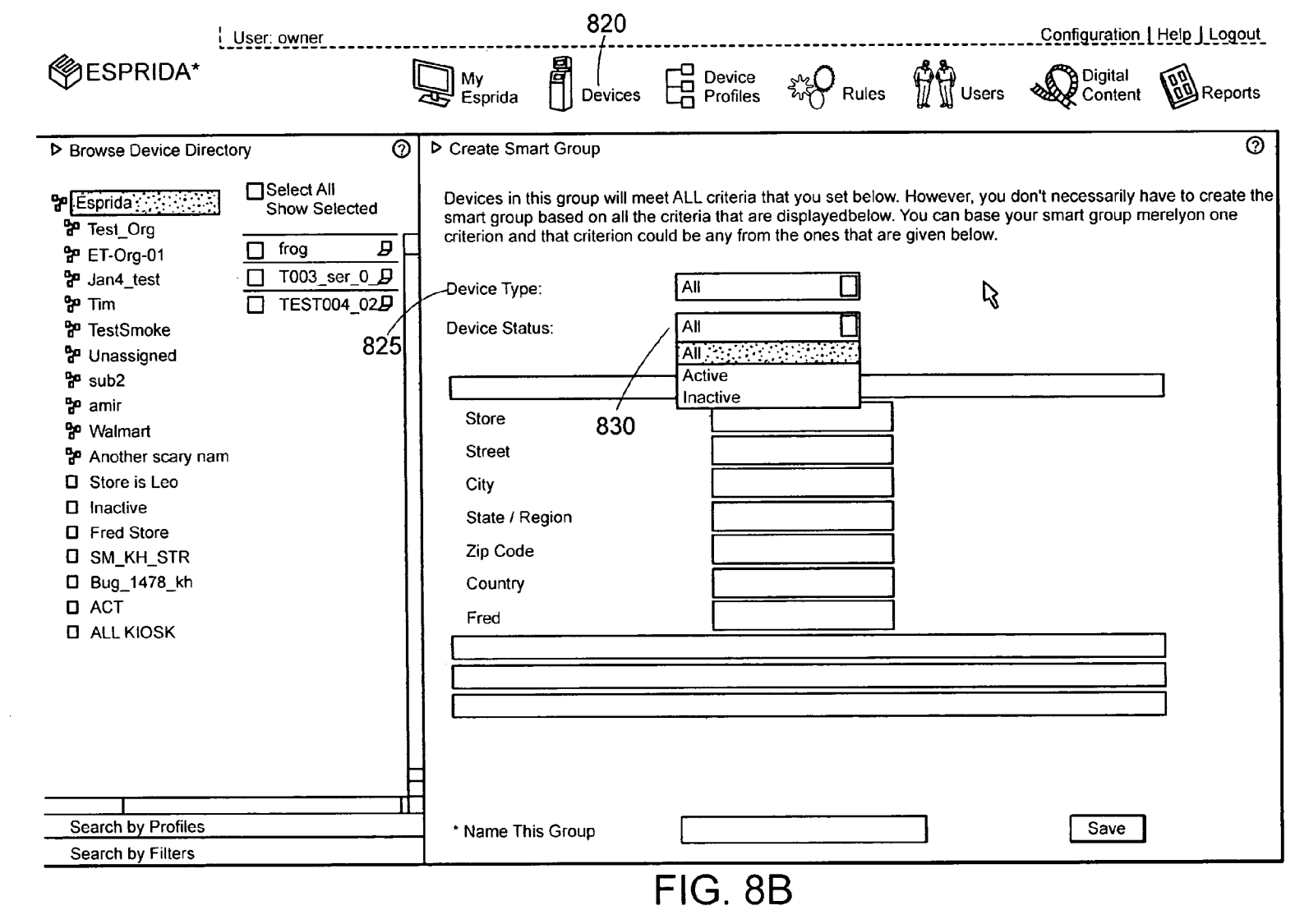

A user may also create a grouping of devices that share one or more common attributes. Attributes may include, without limitation, locations, contact information, software/hardware configuration, licensing states, device errors, external reference information, and/or versioning information. As shown in FIG. 8B the user selects the devices tab 820 and creates an "organized group." The organized group does not require a user to explicitly select devices in order to place them into the organized group. The user can select device attributes for the group. For example, the user may select a particular device type 825 or a particular device status (active, inactive, all) 830. The server will then search for all devices that meet the criteria, creating a listing of these devices and storing the listing in memory associated with the server. The server will then distribute to each member of the group a listing of the group criteria. If the device attributes are changed, for example, through a hardware upgrade so that the device is no longer has a group attribute, the device will contact the server. In one embodiment, the server will check to see if the intelligent device should still be part of the group by accessing the group criteria and comparing the updated criteria for the intelligent device to the group criteria. In other embodiments, the device will send a signal to the server indicating that the intelligent device is no longer a member of the organized group. The server will then remove the intelligent device from the organized group listing and will no longer contact the intelligent device with updates for the group. It should be understood, that there may be multiple organized groups each having different device attributes. Additionally, organized groups can be accessed through the web interface by a user through the Internet. Thus, multiple users can use organized groups and can obtain information about devices in the organized group. Different users who have different authorization levels may access the same organized group; however they may only access authorized information for the group. An authorized user, such as the organized group's creator may access the server and change the attributes for an organized group. The server updates the organized group listing and updates each of the current group members and new group as to the device's status for the group based upon the attribute changes. The process of updating the group members happens automatically without intervention by the user. As a result, organized groups provide a mechanism for management of large numbers of devices. Attribute-based grouping and re-grouping can take place without user intervention.

Additionally, multiple users can remotely access and use organized groups for obtaining information about devices within the organized group. Reports can be defined for organized groups and users can log in through a web interface to the server accessing the web services access layer and the reporting service if reporting is desired or the rendezvous service, if updating of the business rules is desired, for example.

For each device, or for groups of devices within the platform, a set of business rules can be developed. A user can define business rules for a single device or for a organized group. FIG. 8C shows the relationship between business rules 840, device profiles 850 and organized groups 860. A user can define a device profile 850 using a business rule 840. Additionally, organized groups 860 can use device profiles 850 and business rules 840 as indicated by the arrows in the figure.

Figure 9:
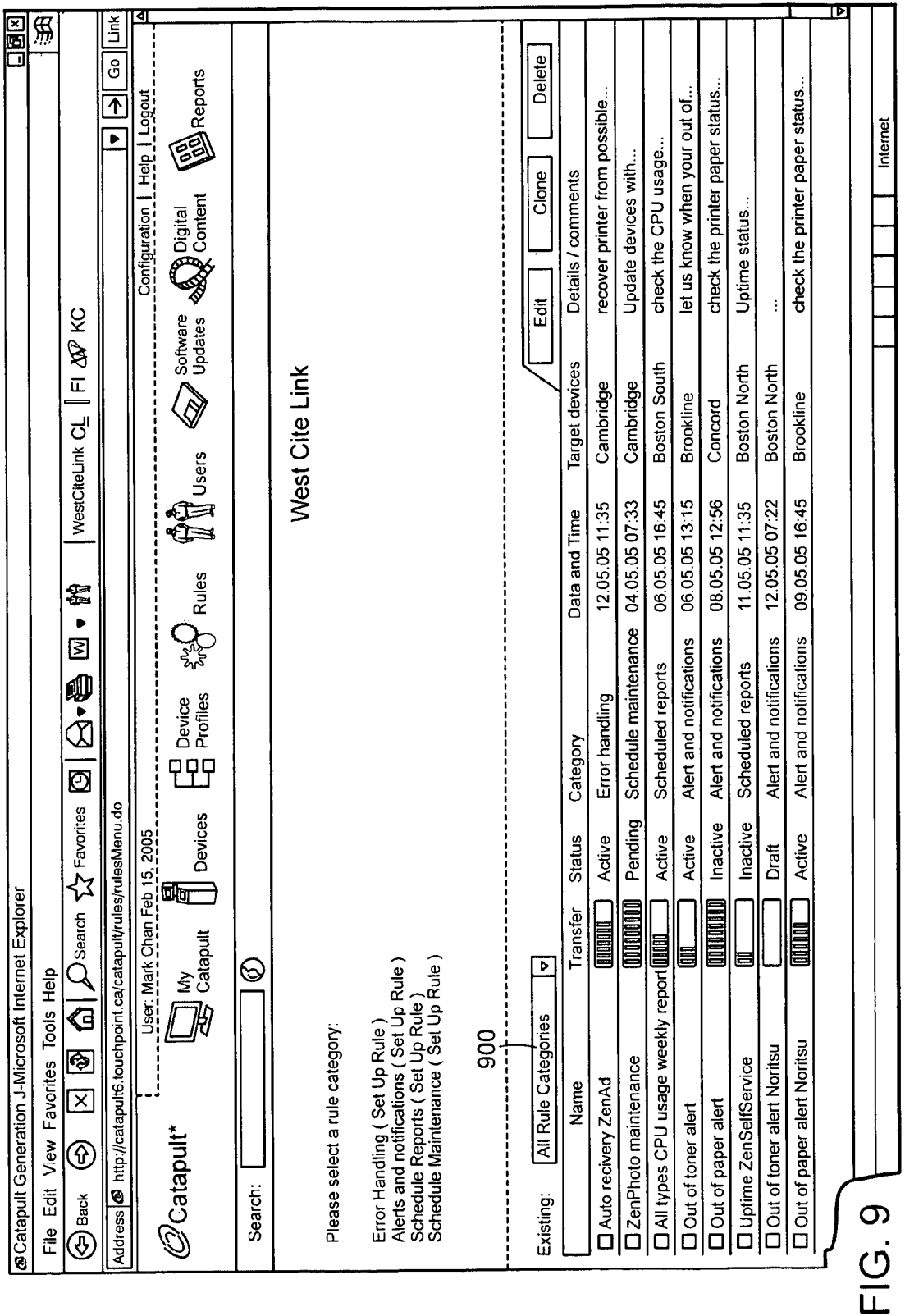
Figure 10:
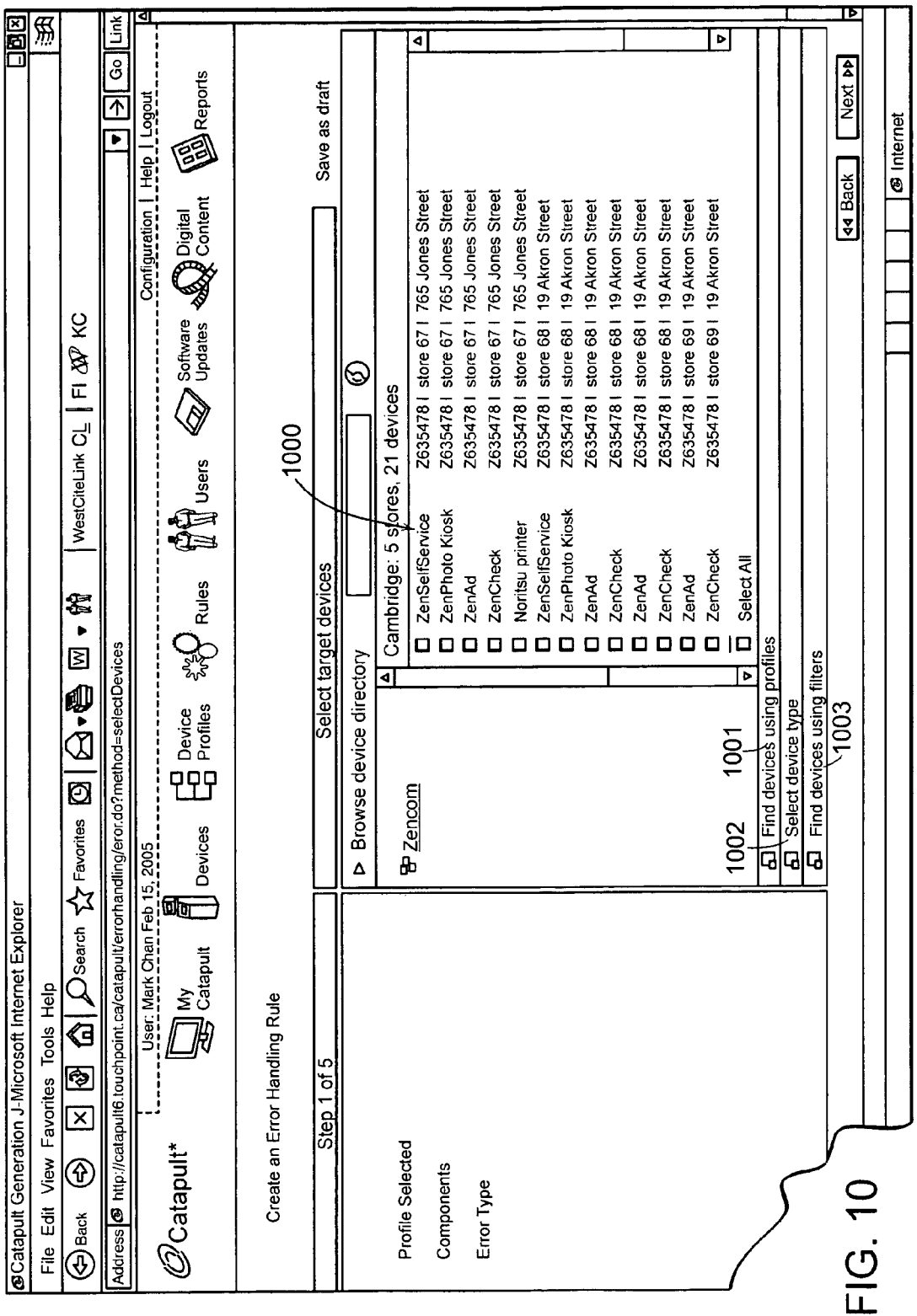
Figure 11:
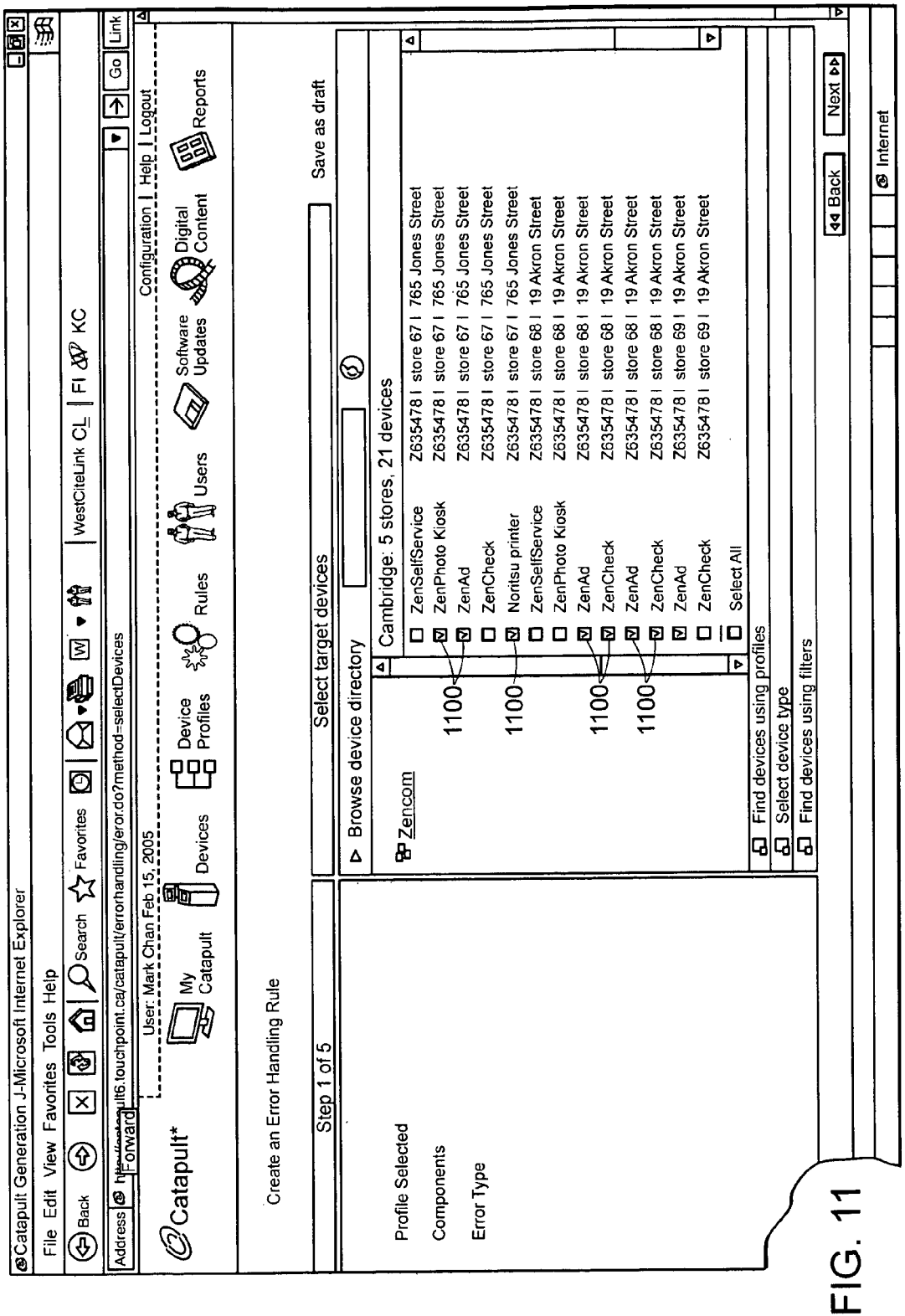
Figure 12:
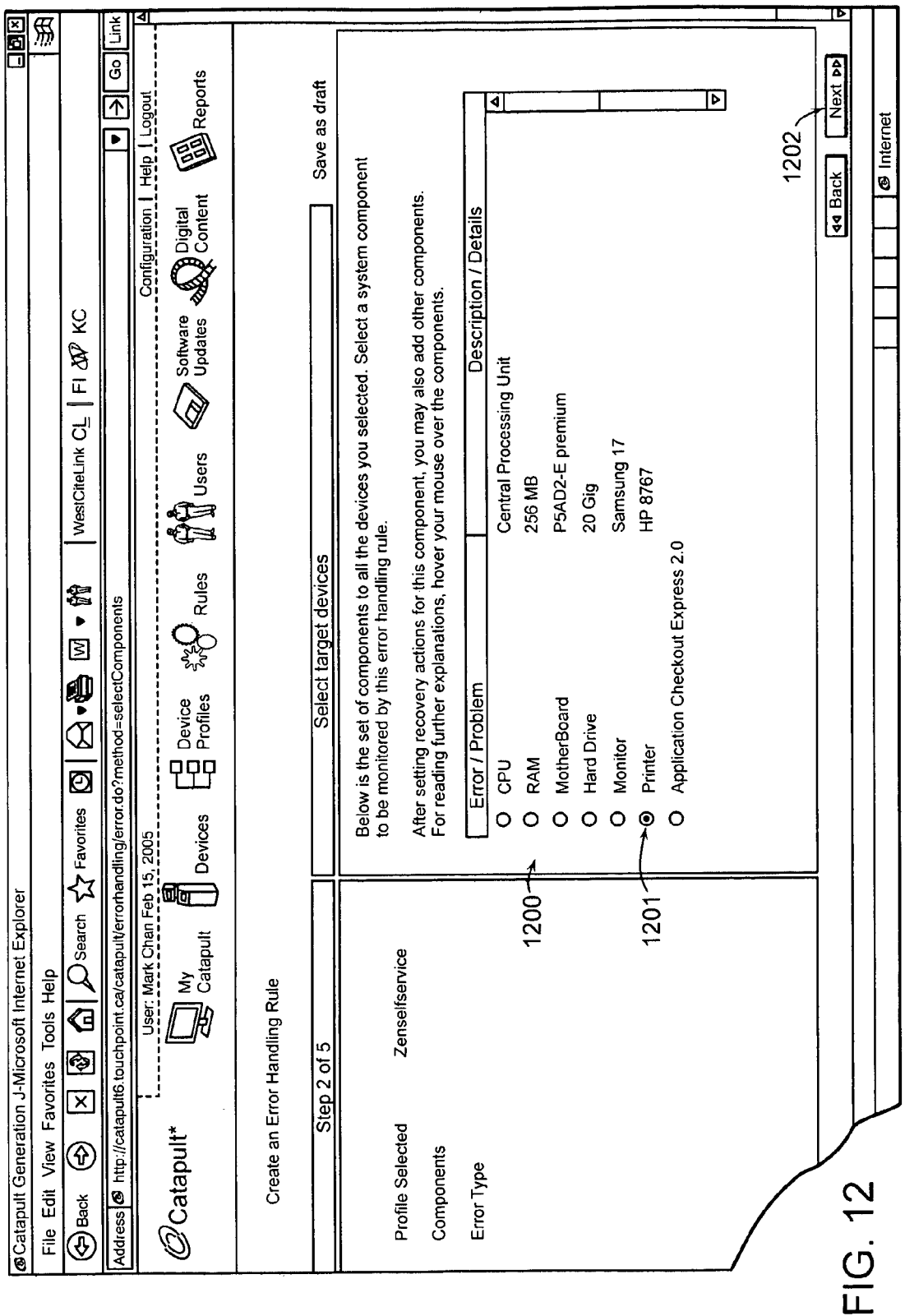
Figure 13:
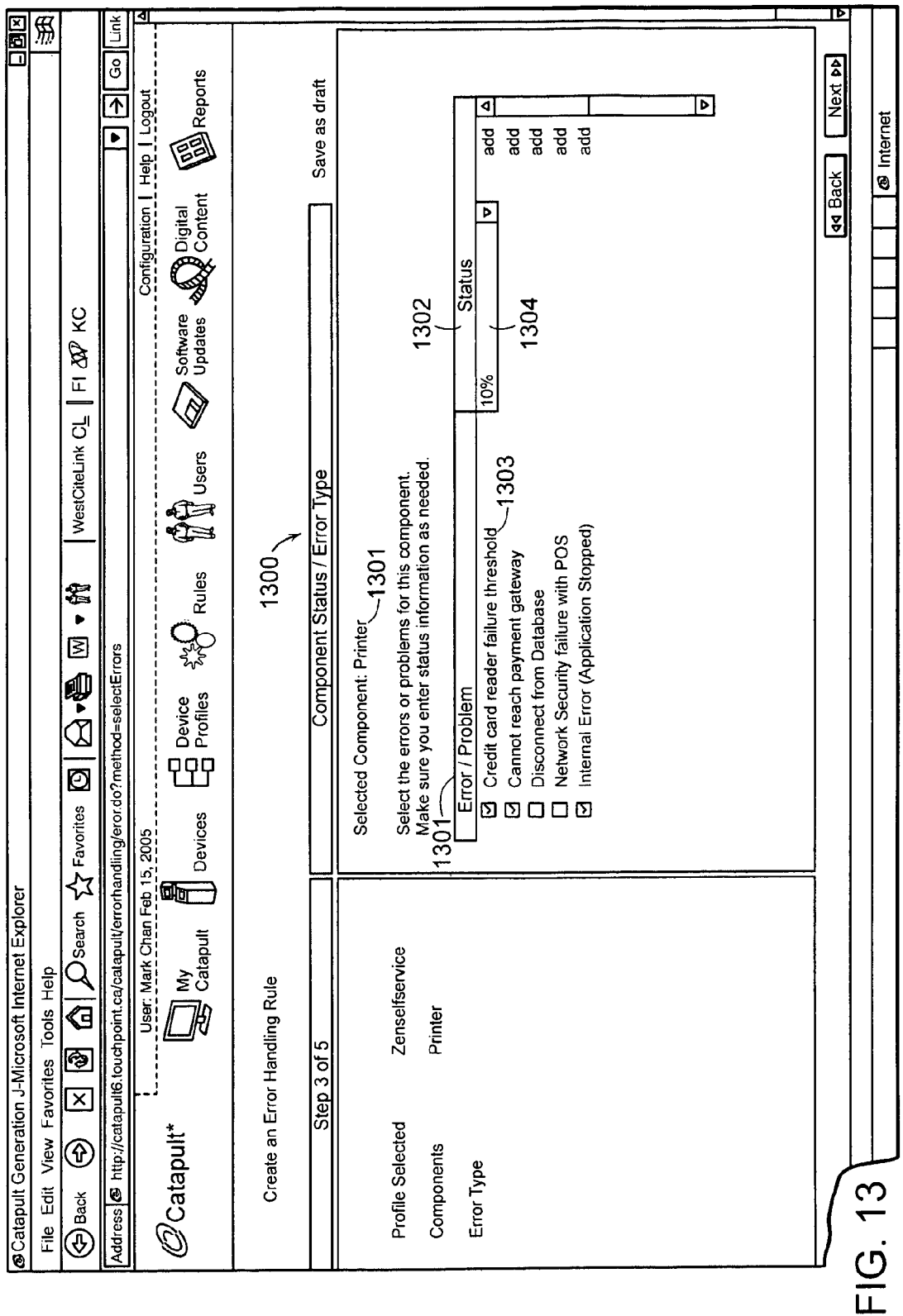
Figure 14:
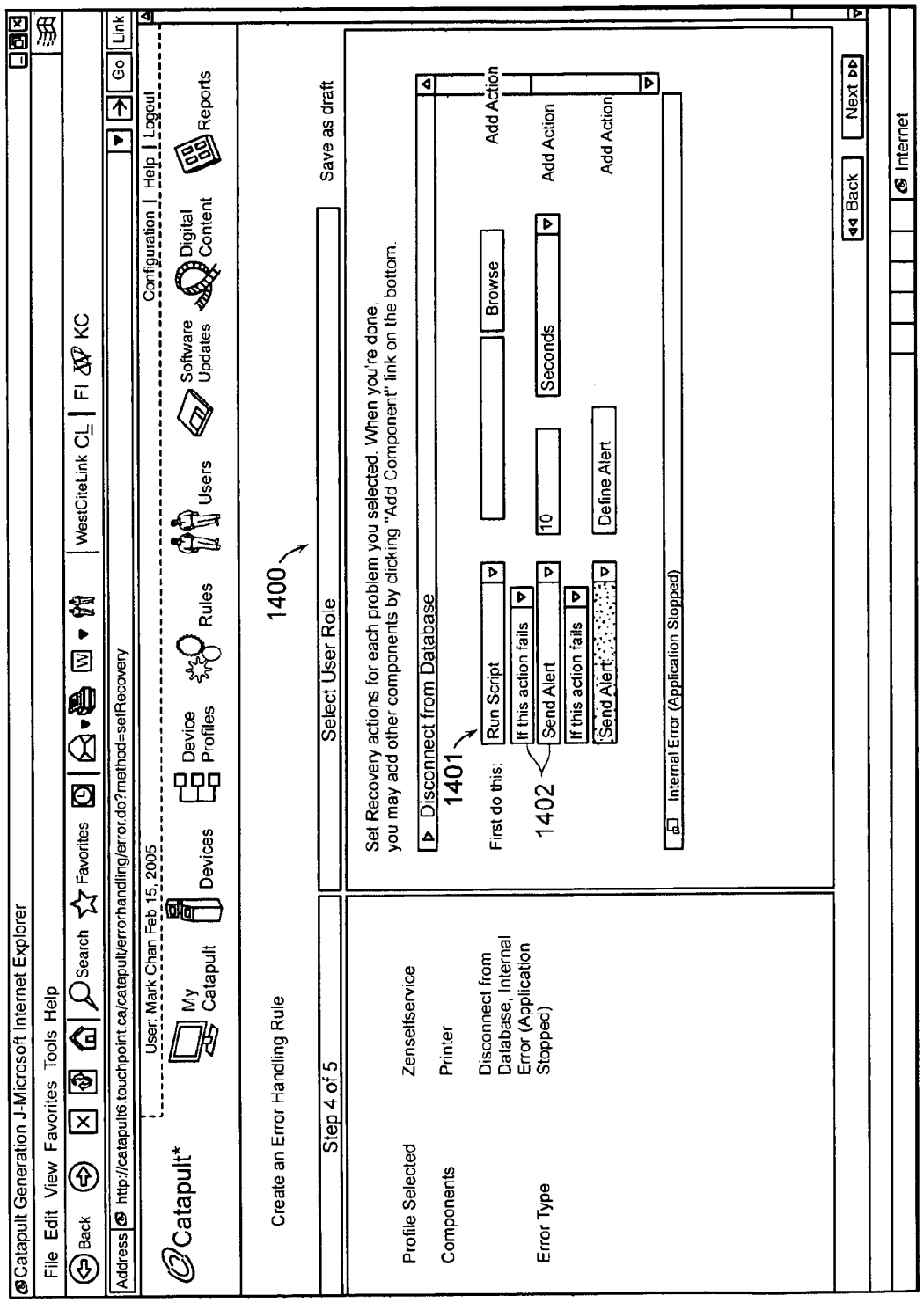
Figure 15:
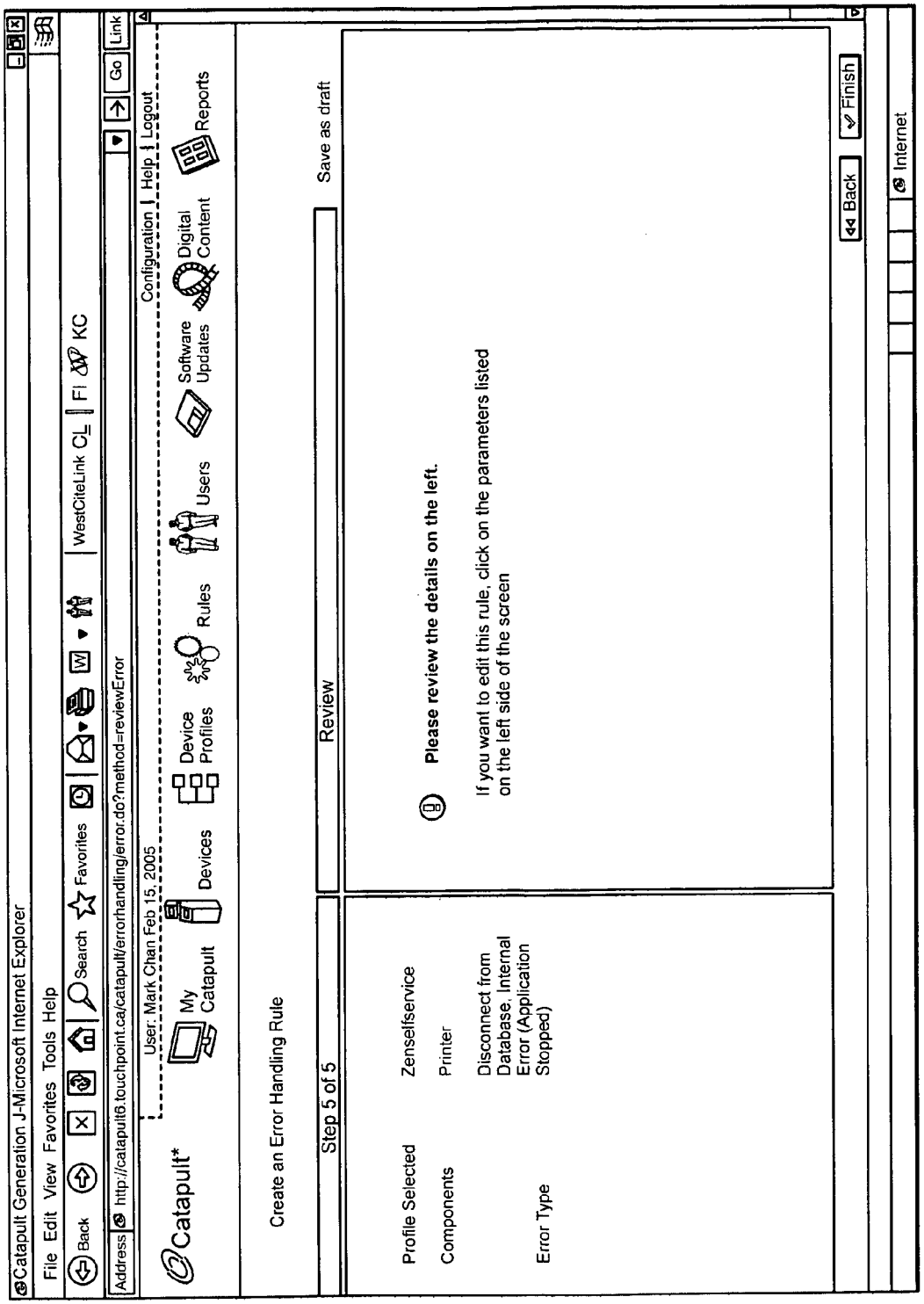

After selecting the rules button in FIG. 8, a user causes an HTTP transmission to the server and a new screen will appear for the rules accessing the business rules module 309A. FIG. 9 shows a screen shot of the business rules page. A user can then select from various rules categories 900 to create a new rule or the user can select from an existing rule accessing error handling module 307a. The screen shown in FIG. 10 is presented to a user if a user selects to set up a new error handling rule. The user can then select from any of the devices within the platform. As shown, the user is provided with a listing of 1000 devices that may be selected. The user can filter out devices by selecting the "Find devices using filters" button 1001, or the user can identify particular types of devices that the user wishes to implement the rule for by selecting the "select device type" button 1002. Further, the user can select devices based upon device profiles 1003 accessing device profile module 316a. FIG. 11 shows that 8 devices have been selected in this example for creating the error handling message as indicated by the check marks 1100. FIG. 12 shows all of the components 1200 of all of the devices that have been selected for which a common rule can be created. In FIG. 12 the user has selected to create a rule for a printer 1201. The user selects the next button 1202 and is presented with component status/error type screen 1300 as shown in FIG. 13. The screen displays selectable errors/problems 1301 that are specifically associated with a printer 1301. The screen also allows for selection of a status 1302 for the printer with respect to certain error types. In FIG. 13 the error "credit card reader failure threshold" 1303 includes a status selection 1304 and the user can select from a plurality of percentages from a drop down tool. As shown, multiple errors/status can be combined together to form a compound error requirement. Only errors that are associated with printers are provided for selection, although there may be many other error conditions for other devices. Thus, the system provides context sensitive information. Context sensitivity can be based on a multitude of variables including the selected server, the selected organized group/devices, user authorization, location, and metadata about the devices. Based, upon the error/status, the platform allows for a selection of steps to be performed either by the client component or by the server if the error/status condition occurs. As shown in FIG. 14, the business rule 1400 that is selected is to run a script and if the script fails to send an alert after a given period of time. The user can select the actions 1401 to be performed, whether subsequent actions should be taken 1402, and the conditional statements for the actions. The actions that are taken can occur on the client component or on the server component. For example, the script will be interpreted within the client component and the alerts will originate from the server component. FIG. 15 is the final screen that is presented when an error handling business rule is created. It should be recognized that the screen shots of FIGS. 9-23 are provided for illustrative purposes and many different combination of business rules and reports may be generated based upon the intelligent devices within the network using the system architecture disclosed in FIGS. 1-8 and 24-25.

Figure 16:
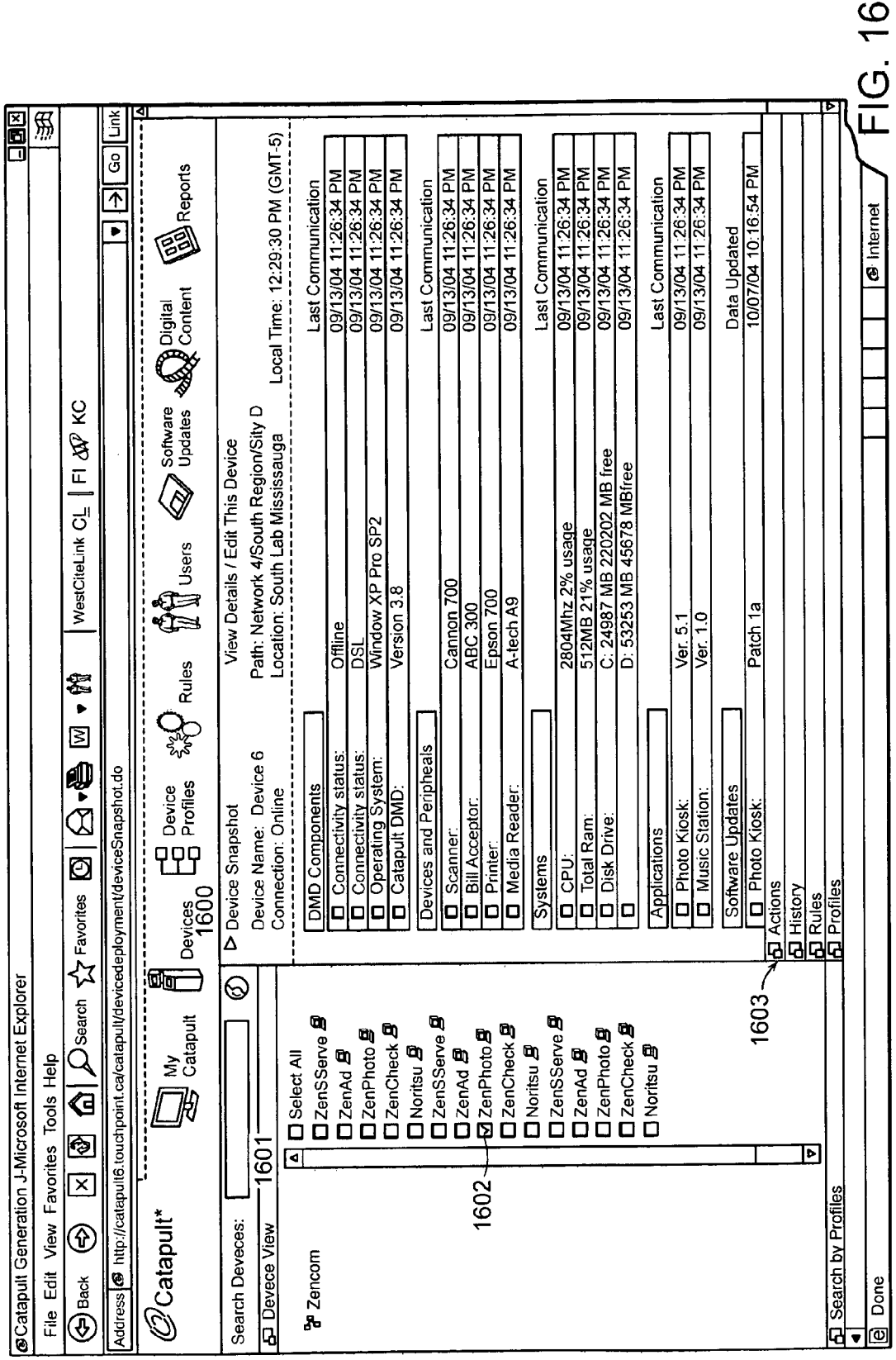

FIG. 16 is a screen shot that occurs if the device icon 1600 is selected from the bar at the top of the web browser window. The device icon 1600 is highlighted by an arrowhead. The device view 1601 which is found on the left side of the screen shows that device information for the device named Zen-Photo 1602 is being displayed on the right hand side of the screen. A user may move between the devices in the device view and different device snapshots will be presented on a new screen. Also provided are a series of selection bars 1603 that include: actions, history, rules, and profiles. The user may move between this information by selection of the bar which will result in the display of a new screen. The selection bar is also context sensitive based upon variables such as the selected business rule, device, location, meta-data or device characteristics. The device snapshot provides information about the device and also the accompanying client component. As shown, the ZenPhoto device includes a CPU, disk drive, scanner, bill acceptor, printer, and a media reader. The device may be used as a photo kiosk or a music station. If a user wishes to know further information about the device, a different selection bar may be selected.

Figure 17:
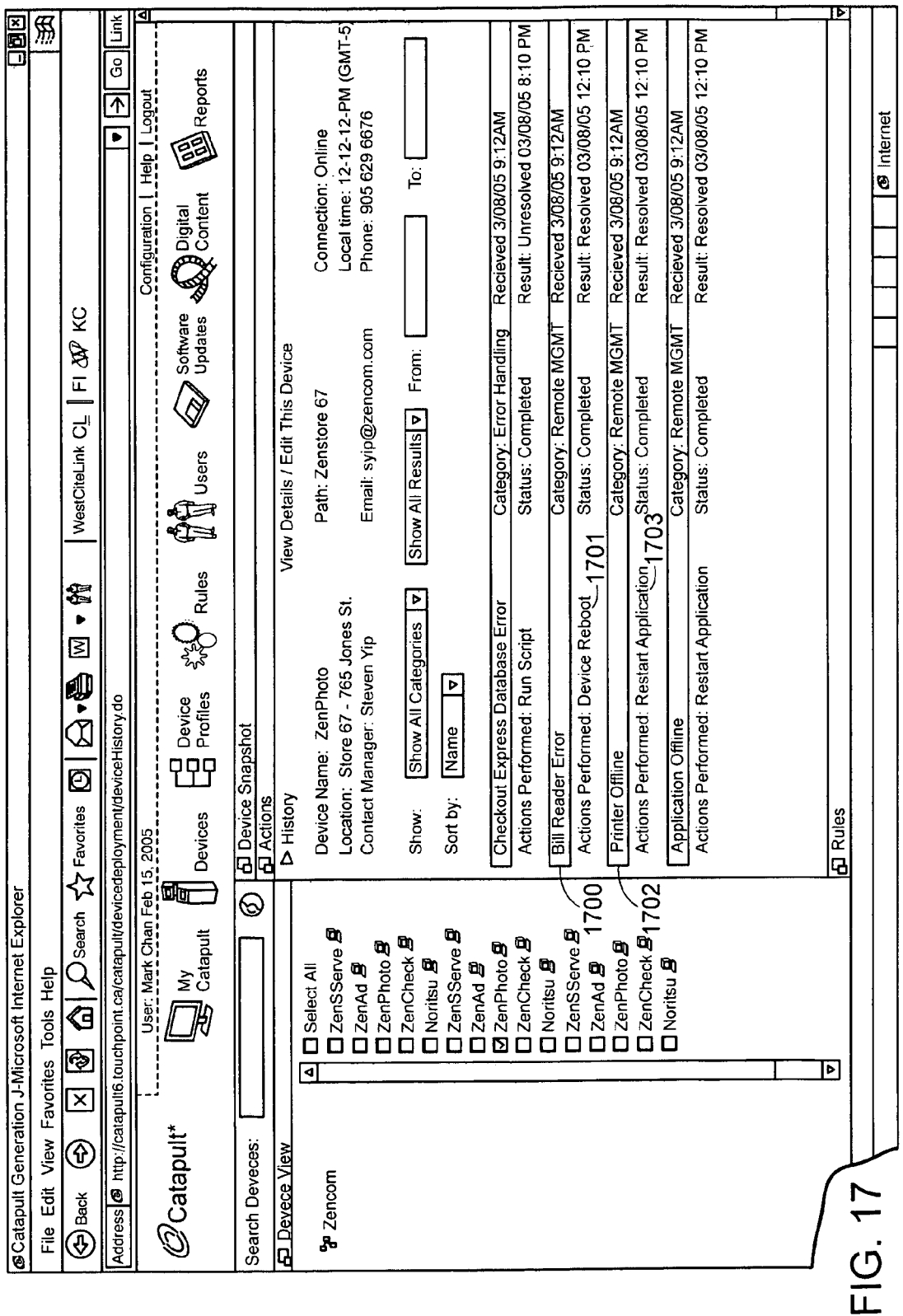

FIG. 17 shows the history view, when the history selection bar is selected as shown in FIG. 16. Device actions are recorded and saved by the client component and the resulting information is passed to the server component for presentation. The server receives the information as the result of the client component initiating the communication. As shown, the device has encounter a number of error conditions (wherein the error conditions were previously defined for the device by creating error condition business rules) including a bill reader error 1700 which caused the client component to cause a device reboot 1701 and an offline printer condition 1702 that caused the client component to restart the application 1703.

Figure 18:
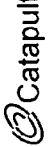

FIG. 18 is a screen shot showing the selection of the digital content icon 1800 which accesses the content distribution module 312a and the content distribution service 303a. The screen indicates the title of the digital content 1801, whether a transfer has been authorized, the status of the digital content 1802, a category for classifying the digital content 1803 and as well as the targeted devices 1804 and a date and time for the transfer 1805. A user can filter the listing of digital content and may also edit, delete, activate, deactivate or change the distribution schedule by selecting a corresponding button. As already indicated, when a button is selected by a user, using an input device by graphically selecting the button, an instruction is transmitted from the computer terminal as an XML/SOAP message through HTTP which requests the appropriate screen for display from a module of the server component.

Figure 19:
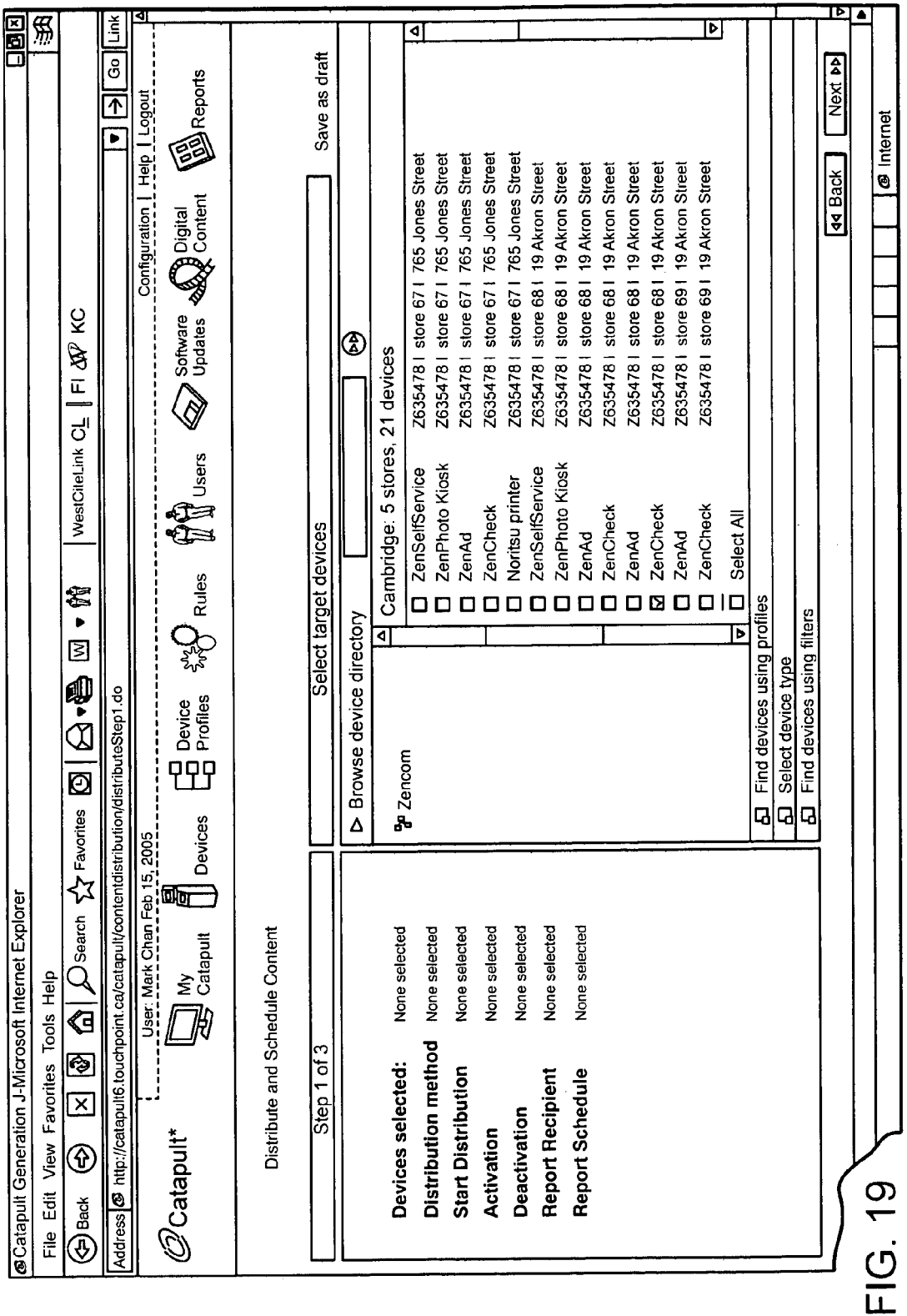

FIG. 19 is a screen shot that is presented after the selection of the "change distribution schedule" bar. From the profile of all of the devices, the server component filters out the devices that are capable of receiving digital content and those devices are presented and are selectable by the user. In FIG. 19, the ZenCheck device is selected.

Figure 20:
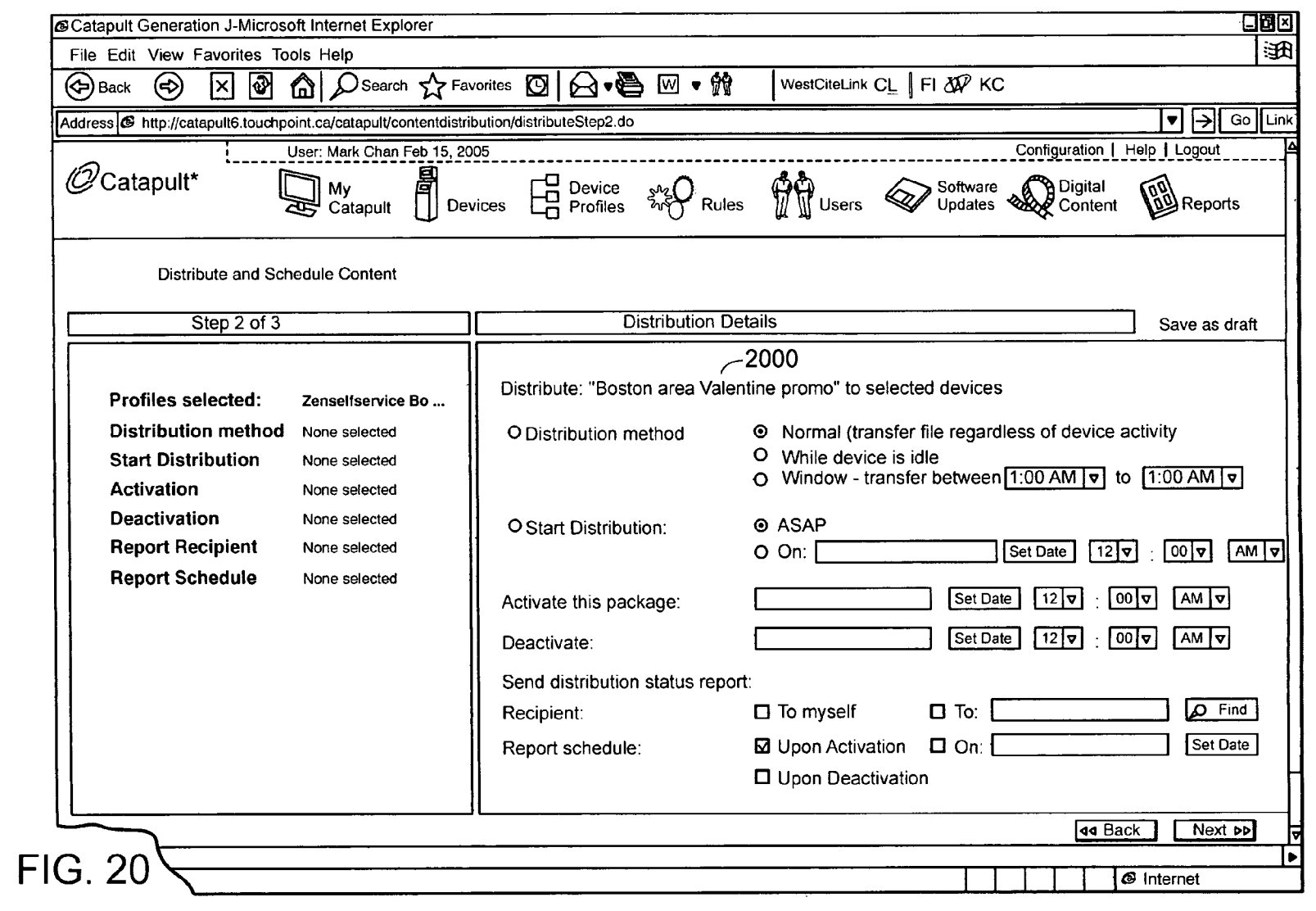
Figure 21:
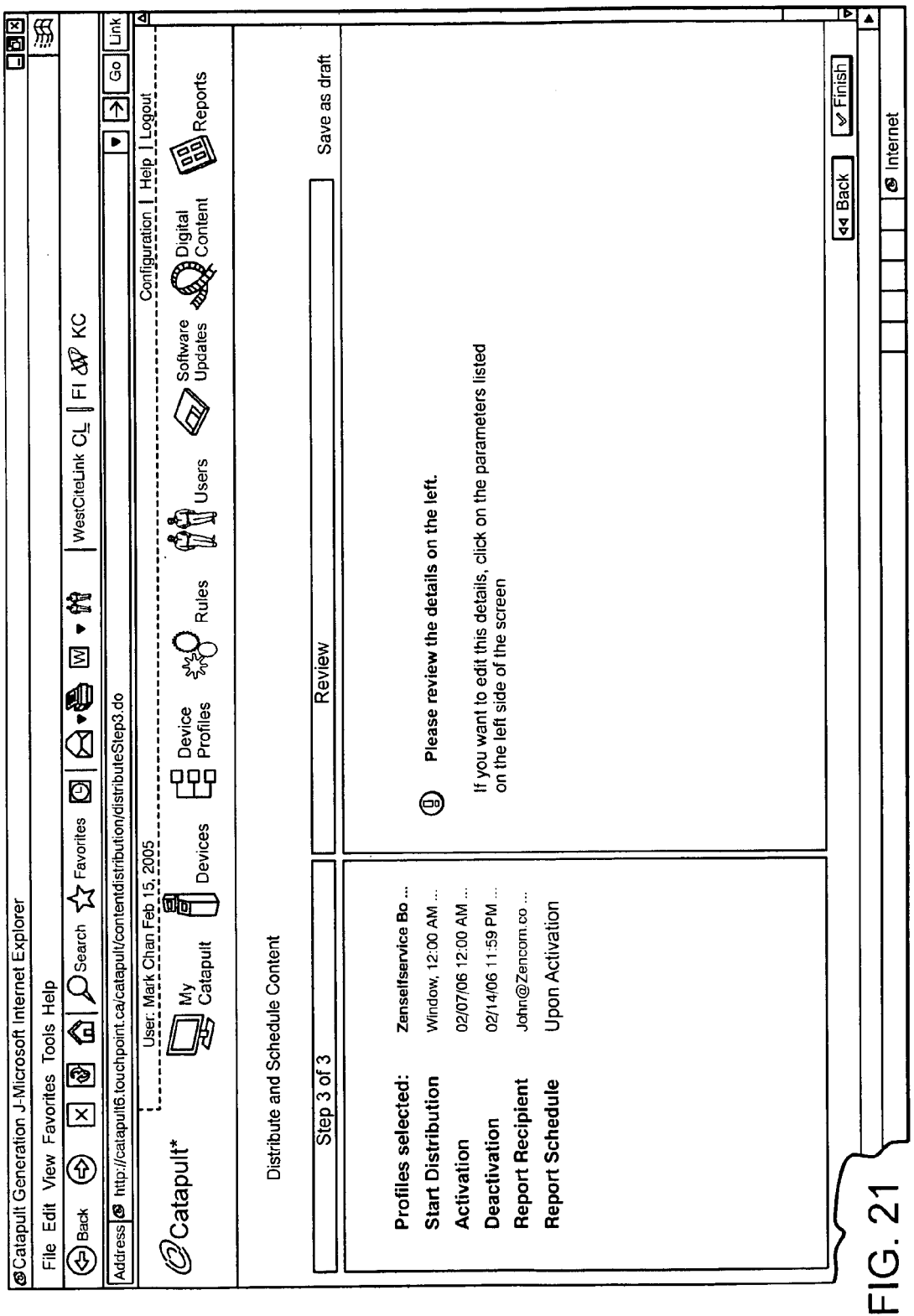

FIG. 20 is a screen shot that allows the user to select the time and date for distribution of the digital content, which is the "Boston area Valentine promo" 2000. The user can set the various parameters that are available and then select the next button which transmits the information to the server and which will schedule the transmission of the desired digital media to a specific device that is part of the platform. FIG. 21 is a screen shot that confirms that the download of the digital content has been scheduled for the ZenPhoto device. The module and services of the server monitor, the content distribution status receiving either scheduled or periodic updates originated by the content distribution module of the client application associated with the intelligent device. A user can generate the status updates by creating a business rule for status.

Figure 23:
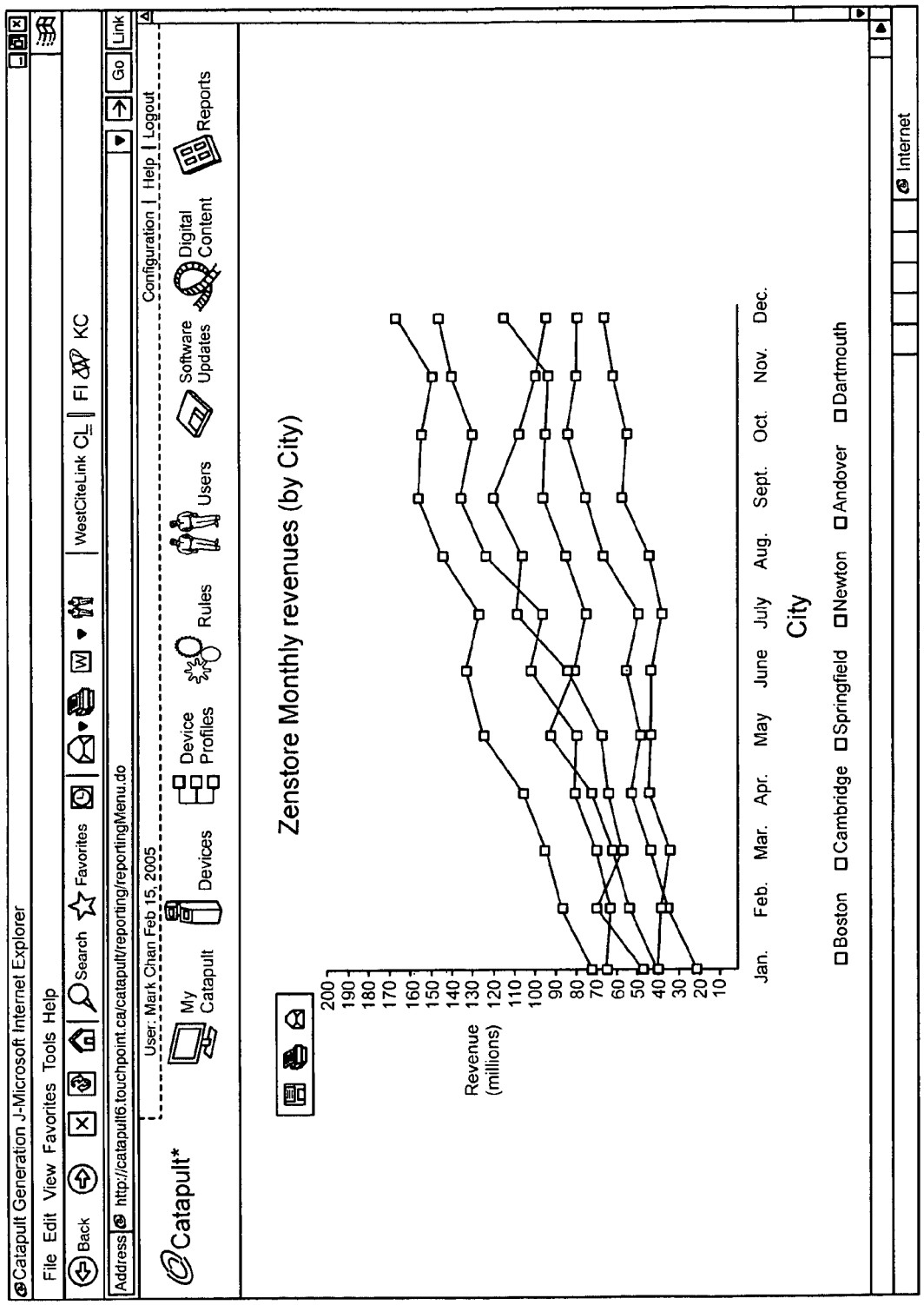

In addition to providing information to the client components associated with the devices (digital content, business rules, configuration information), the server component can also create reports based upon information that has been received from the client components about the devices (status information). As shown in FIG. 22, the user has selected the reports icon 2200. The user can then select a predefined report for viewing or can create a report. If the user decides to create a report 2201, he will be provided with a series of screens wherein each screen is based upon the previous selection. Thus, the screen that is presented to the user depends on all of the information that is selected and provided by the user. FIG. 23 shows a screen shot when the predefined report entitled "Log Activity by Profile" is selected. When creating a report, a user uses the report module 313a. The report module 313a allows the user to configure reporting parameters. The report module also executes all reporting operations on the client including reporting data generation. The reporting module 313a in combination with the business rules module 309a may be used to create reports that are generated based upon pre-determined events or specific device types.

Figure 24B:
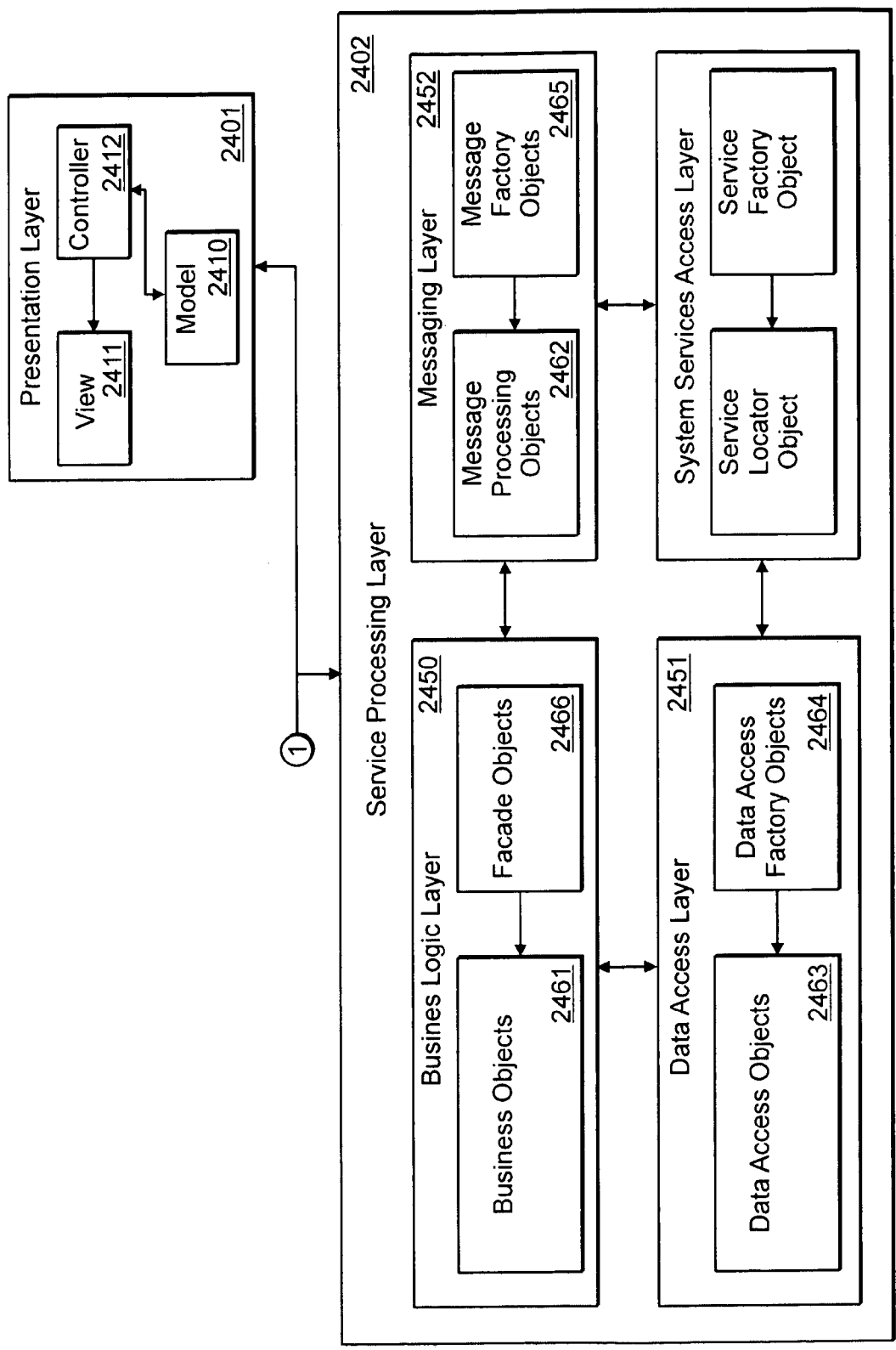
FIG. 24 is a high level layer design of the server.
Figure 25B:
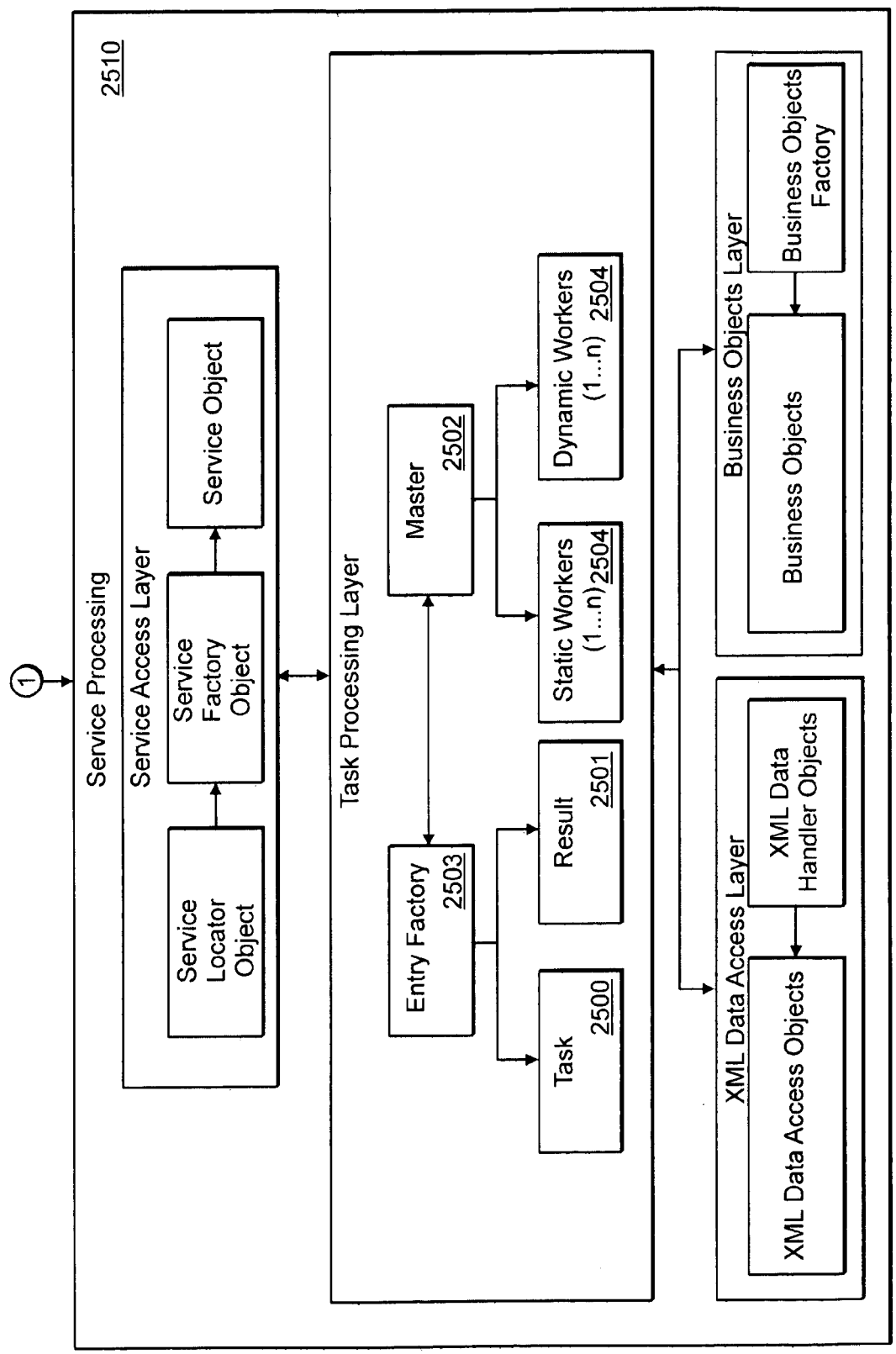
FIG. 25 is a high level layer design of the client.

FIGS. 24 and 25 provide a more detailed view of FIGS. 3 and 4, respectively, More particularly, FIG. 24 shows the various layers including the service interaction layer 2400, the presentation layer 2401 and the service processing layer 2402 and the modules within the layers. These modules support the services and corresponding application modules as shown in FIG. 3.

The presentation layer 2401 will first be addressed. The model module 2410 represents the business domain and the rules that govern access to and modification of that domain. The model 2410 provides the ability for the view to query the model about state and may proactively notify the view when it changes. The model is responsible for activating business processes or changing the state of the model. The view module 2411 renders the contents of a model. The view module 2411 accesses data from the model module 2410 and specifies how that data should be presented. The view module 2411 is responsible for maintaining consistency in its presentation when the model module 2410 changes. The view module 2411 forwards the users actions/requests to the controller module 2412. The controller module 2412 defines application behavior. The controller module interprets user actions/requests and maps them to actions that are to be performed by the model module 2410. In a Web application, the action/requests appear as GET or POST HTTP requests. Based on the outcome of the model module commands, the controller module 2412 selects the view to be rendered as part of the response to the user request.

The server component can serve dynamic content, since the server combines the use of both servlets and JSPs (Java Server Pages). It takes advantage of the predominant strengths of both technologies, using JSPs to render the presentation layer and servlets to perform process-intensive tasks. Here, the servlet acts as the controller and is in charge of the request processing and the creation of any beans or objects used by the presentation layer, as well as deciding, depending on the user's actions, which dynamic page to send the request to. The page is responsible for retrieving any objects that may have been previously created by the servlet and extracting the dynamic content from that servlet for insertion within static templates. This approach results in a separation of presentation from content. The platform's design ensures that the presentation layer 2401 does not contain or invoke business logic directly, but enforces the separation of business logic layer from the presentation layer. In more defined terms, all calls from the presentation layer to a business object in the business layer are prohibited.

In addition to the controller servlet/module, the presentation layer includes an Action base class, error handling support, form beans to interact with forms, and JSP views. JSP Tags are utilized to access some of the application interface components. JSP Tags provide clean separation between the back-end & front-end code providing seamless integration between the back-end and front-end code, wherein the front end is the user interface and presentation layer, and all other layers are considered the back end. As used in this specification, the terms "layer" and "tier" are used synonymously.

The controller servlet/module is used as the initial point of contact for handling a request. The controller servlet manages the handling of the request, including invoking security services such as authentication and authorization, delegating business processing, managing the choice of an appropriate view, handling errors, and managing the selection of content creation strategies. The controller servlet provides a centralized entry point that controls and manages web request handling. By centralizing decision points and controls, the controller servlet also helps reduce the amount of Java code. Centralizing control in the controller servlet and reducing business logic in the view module promotes code reuse across requests. The controller servlet ensures that the web components needed by the application are initialized when needed.

The service interaction layer 2400 has several major responsibilities, including providing an interface the service presents to the client component. Since the client components access the service through it, the interface is the starting point of a client's interaction with the service. The interaction layer 2400 also handles other responsibilities, such as receiving client requests, delegating requests to appropriate business logic 2421, and creating and sending responses 2420. The interaction layer 2400 also includes the logic for how the service delegates the requests to business logic and formulates responses. When the service interaction layer 2420 receives requests from clients, the interaction layer 2420 performs any required preprocessing before delegating requests to the business logic. When the business logic processing completes, the interaction layer sends back the response to the client.

The service processing layer 2402 holds all business logic used to process client requests. It is also responsible for integrating and interacting with other system services such as databases and messaging using the data access layer 2451 and the messaging layer 2452.

As previously mentioned the server component includes an action class. The Action class is responsible for handling the events generated by the user. A typical Action class will implement logic including:
Validating the current state of the user's session.
Perform the processing required for this request, such as calling a component.
Updating the server-side objects used to create the next page of the user interface.
Returning an appropriate ActionForward object that identifies the JSP page to be used to generate the response, based on the newly updated beans.

A web bean acts as a local proxy for a remote service or module. It hides the underlying implementation details of business services, such as lookup and access details of the EJB (Enterprise Java Bean) architecture. Using a web bean reduces the coupling between the business process layer and the core services layer. The web bean can shield client components from possible volatility in the implementation of the business service API. This reduces the number of changes that must be made to the business process code when the business service API or its underlying implementation changes. The client component becomes transparent to naming and lookup services. The web bean also handles the exceptions from the business services such as EJB exceptions, JMS exceptions, and so on. The web bean may intercept such service level exceptions and generate application level exceptions instead. The web bean provides an opportunity to cache results. Results can significantly improve performance, because it limits unnecessary and potentially costly round trips over the network.

The platform's web service tier provides the infrastructure of communication and data exchange between client components and the server component. This tier includes all the web services end point interfaces. Web services may be designed and implemented as Document Style web services. Adaptor objects are used as a proxy between the service interaction layer 2400 of the application and the business logic layer 2450. Requests that are made to the service end point interface will be translated and passed to the business logic layer 2450 for processing. Adaptor objects 2460 also convert message objects to domain objects and delegate the service request to the business logic 2450 to perform the specific business process. Adaptor objects 2460 allow the decoupling of the service interaction layer 2400 and the business logic layer 2450. They also provide a transparent way to access application functionality from the service interaction layer 2400. It increases reusability and scalability of the application.

Message objects 2462 are used to encapsulate XML message data exchanged between the client and the server. The Business objects 2461 will access XML message data that's only encapsulated in message objects. Message objects 2462 allow the decoupling of the business objects and the XML message data. They also provide a transparent way to access the XML message data. It increases reusability and scalability of the application.

The messaging layer 2440 enables asynchronous communication between the client and the server. This will enhance application response time and increases scalability of the application. All SOAP and XML messages use an Enterprise Message Bus strategy to deliver messages to the application using (Java Messaging System) JMS. A Message Driven Bean (MDB) is a JMS message consumer. A client component cannot access a MDB directly. Application interfaces with the MDB by sending a JMS message to the destination of which the MDB is listening. This allows for the concurrent processing of a stream of messages. Message Driven Beans are transaction aware. Application severs provide support for clustering MDM as well. Message Driven Beans (MDB) are used to process messages sent form the client to the server. MDB delegates the business process the business objects in the business logic tier.

The business logic layer 2450 utilizes Business Delegate Pattern and Handler Pattern. Business Delegate Pattern provides decoupling of the Business Logic Tier and the System Services Tier, and provides a proxy interface to the services. Handler pattern manages query execution, results and results processing. This results in higher modularity and reusability of the application code. It also increases the application scalability.

The business tier employs a limited number of EJB to the architecture such as Message Driven Beans for JMS message processing and Stateless Session Beans to be used with the timer service for scheduling actions as shown in FIG. 5. All business services implemented using EJB Message Driven Beans or Stateless Session Beans will have a façade object 2466 (shown in FIG. 24) that hides the detailed implementations of each business service form other components that interact with the service.

The J2EE timer service as shown in FIG. 5 will be used for scheduling actions at certain intervals to initiate specific business processes. For these types of actions, applications usually employ some form of a timer service. An application that initiates some batch operations such as scanning a database and cleaning up dead records or executing certain time based business rules may use a timer service. J2EE 1.4 includes robust timing service that is used when the application requires some periodic events to automatically get initiated and is not handling real-time events. Enterprise beans are introduced into the architecture of the application using a stateless session beans specifically for this service.

Data Access Object Design Pattern is used to access system resources. Data Access Object pattern abstracts, and provides transparent access to data sources and system resources. DAO design pattern increases portability of the application. The data access object (DAO) 2463 is used to abstract and encapsulate all access to the data source. The DAO 2463 manages the connection with the data source to obtain and store data.

The DAO 2463 implements the access mechanism required to work with the data source. The data source could be a persistent store like an RDBMS, an external service like a B2B exchange, a repository like an LDAP database, or a business service accessed via CORBA IIOP or low-level sockets. The business component that relies on the DAO object 2463 uses the simpler interface exposed by the DAO 2463 for its clients. The DAO 2464 completely hides the data source implementation details from its clients. Because the interface exposed by the DAO to clients does not change when the underlying data source implementation changes, this application architecture allows the DAO 2463 to adapt to different storage schemes without affecting its clients or business components. Essentially, the DAO acts as an adapter between the component and the data source.

The system services access tier is now described. The platform utilizes factory classes to create application services including data access service 2464, messaging service 2465 and logging service. The factory objects provide a standard way of creating and accessing these services independent of their implementation. It allows for an important separation between these services and the objects that use them, so that different implementations can be swapped in and out. (e.g., database messaging).

The platform utilizes Java Naming Service, RDBM, File System and Mail Server. Java Naming and Directory Interface provide a standard way for accessing system services and resources. It also increases manageability and portability of the application.

The platform also utilizes a common interface for application logging. This interface is a wrapper around the specific logging package that is used in the application. All components in the application use this wrapper to log debugging and error information. This allows for application logging at runtime without code modification. It also enables a standard mechanism for application logging.

The database that is used with the platform does not have access to application logic. Additionally, the platform does not share table space with any other objects using the same database to avoid security risks.

The platform supports HTTP as the underlying communication protocol between the server and the client. Data exchange between the client and the server is handled through XML or/and SOAP communication. XML is used to provide light weight protocol for sending frequently generated data such as heartbeats and component status. SOAP is used for transferring large amount of data and files while supporting all standard SOAP security features on top of HTTPS (SSL). Other objects shown within FIG. 24 are well known to one or ordinary skill in the art and shall not be elaborated on within this disclosure.

The client application design is shown in FIG. 25. Client component follows the architecture of the master-worker pattern where the master and workers operate within in memory space that manages the tasks that the workers have to execute. The master-worker pattern nicely represents the use of the space to define the business logic and processes that are encapsulated in the entries of the space. There are two types of entries that are used on the client component: task and result entries (2500, 2501). The master 2502 posts task entries asynchronously to the space 2503, as requested on ad-hoc or scheduled basis. The responsible workers 2504 process the tasks 2500 in parallel returning the results into the space as result objects (2501). The master 2502 collects the results and handles them. There are number of advantages to using this architectural pattern. The interacting processes are decoupled by using the space as communication medium which allow the architecture to scale linearly. New features may be added to a service without affecting existing services. Access can be made simultaneously to data and system functionality. The space transparently satisfies the simultaneous data access operations of multiple processes running in parallel. The space harbors a storage mechanism that guarantees that objects remain accessible until a process explicitly removes them.

The master module 2502 is responsible for posting tasks into the space and collecting results of tasks 2500 execution. The worker modules 2504 are responsible for executing tasks that are posted to the space. Each worker is responsible of executing a specific task. The task and result objects 2500, 250 1 implement the specific business logic or functionality that need to be performed by the client. Each task object 2500 has a corresponding result object 2501 that knows how to handle the outcome of that specific task execution.

The service access layer 2510 houses a number of web services clients that facilitate communication between the client and the server and perform a well defined and discrete business process. API can be created that are readily available for tasks and results. Other layers and objects shown within FIG. 24 are well known to one or ordinary skill in the art and shall not be elaborated on within this disclosure.

The core services layer on the client side (as shown in FIG. 25—XML Data Access Objects) and on the server side (as shown in FIG. 24, System Services Access layer) is responsible for providing common core (functional and utility) services that can be shared by multiple applications. Each core service object performs a well-defined, discrete business process, business function, or utility function. This layer separation provides flexibility and reusability.

The common system services are provided in such a way as to enable them to be extended or modified without affecting the modules that uses them. Common system services include: configuration service (services to retrieve run-time configuration parameters), scheduling service, logging service, system services such as JNDI, JMS, mail, and database connectivity, and XML Service (interfaces to create, retrieve, update, and delete XML documents).

The platform's Notification Framework is a server-based set of modules. This framework provides a number of APIs that allow for creating custom notification actions on the server and integrate them into the work flow and business process of the Alerts and Notifications and Error Handling on the server. In addition, this framework facilitates integration with external Enterprise Systems and provides infrastructure for Enterprise Application Integration (EAI) including Customer Relation Management (CRM) systems, Help Desk and Support systems and legacy systems.

The platform's Component Framework is a client side set of modules. This framework provides the infrastructure for adding and customizing client modules such as application programs and hardware components. This set of modules enables the remote management capability of these components and provides a standard interface for configuring these components using the rendezvous service.

The Job Framework is a client set of modules. This framework allows for greater customization and extension of client component functionality. It provides a simple and flexible yet powerful interface to implement specific business process and integrate it into a client component.

The Web Services APIs is a distributed component infrastructure based on the Service Oriented Architecture nature of the platform. This framework includes a number of APIs that are readily available on client components to communicate with the server component and perform a discrete and well defined business process. It also include the End-Point Interfaces of these business services, so that other clients on other platforms can be built and communicate with these services. This is made possible because these services are designed as Document-Style web services that utilize XML and HTTP as data exchange and communication protocol respectively.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims. It should be recognized that although the embodiments described here is referred to the use of Java and Java based components that other preliminary languages that provide similar functionality may be used without deviated from the inventive concept.

What is claimed is:

1. A system for management of intelligent devices within a network, the system comprising:
   a receiver component located at a server receiving a set of device characteristics, the device characteristics comprising criteria by which an organized group of the networked intelligent devices is defined, and by which the membership of an intelligent device within the organized group of intelligent devices may be determined;
   a group determination component located at the server, the group determination component configured to determine membership of intelligent devices within the organized group by comparing a database containing characteristics of intelligent devices within the network to the criteria;
   the receiver component configured to receive an update signal from any member of the organized group, the update signal comprising an updated configuration for the member of the organized group from which the update signal was received;
   and the group determination component configured to re-assess the membership of the member from which the update signal was received in the organized group by comparing the updated configuration for the member to the criteria, so as to determine if the updated intelligent device is still a member of the group based on the contents of the update signal; and the group determination component is also configured to update the membership of the organized group if the re-assessment of the membership of the member from which the update signal was received indicates that the configuration of the member no longer matches the criteria;
   an information component configured for receiving a request for group information from a networked device other than one of the intelligent devices; and
   a security component wherein when the information component receives a request for group information from a networked device, the security component determines an associated access level for the request and based upon the access level, the security component determines if the networked device can receive the group information, wherein the information component causes a communication module to send the group information to the networked device if the security component determines that the networked device can receive the requested group information.

2. A system for management of intelligent devices according to claim 1, further comprising:
   an interface for receiving at the server a signal indicative of a change to the criteria of the group; and
   wherein the communication module updates the membership of the organized group by comparing the characteristics of intelligent devices within the organized group to the criteria.

3. A system for management of intelligent devices according to claim 1, wherein the criteria comprise one of location, contact information, software/hardware configuration, licensing states, device errors, external reference information, and versioning information.

4. A system for management of intelligent devices according to claim 1, wherein the security component uses a user profile to determine if a networked device can receive the group information.

5. A system for management of intelligent devices according to claim 1, wherein the security component uses a user profile to determine if a user can change characteristics of the group information.

6. A system as claimed in claim 1 in which a client component is associated with each of the group members, which client components are commonly addressable by the server to set an operating rule for one or more of the group members.

7. A system as claimed in claim 6 in which each client component is operable to translate the received operating rule for the operating system of the group member.

8. A system as claimed in claim 7 in which the group members are addressable commonly or individually.

9. A method for management of intelligent devices within a network, the method comprising:
receiving at a server a set of device characteristics, the device characteristics comprising criteria by which an organized group of the networked intelligent devices is defined, and by which the membership of an intelligent devices within the organized group of intelligent devices may be determined;
determining, at the server, membership of intelligent devices within the organized group by comparing a database containing characteristics of intelligent devices within the network to the criteria;
receiving at the server an update signal from a member of the organized group, the update signal comprising an updated configuration for the member of the organized group; and
determining at the server whether the updated intelligent device still meets the criteria defining it as a member of the organized group based on the contents of the update signal by comparing the updated configuration for the member of the organized group to the criteria;
updating the membership of the organized group if the re-assessment of the membership of the member from which the update signal was received indicates that the configuration of the member no longer matches the criteria;
receiving at the server a request for group information from a networked device other than one of the intelligent devices;
wherein each organized group has one or more access levels associated with the group information and based upon a user's credentials received from the networked device, the server determines the group information that the network device can receive; and
sending the requested group information to the networked device if the server determines that the networked device can receive the requested group information.

10. A method for management of intelligent devices according to claim 9, further comprising:
receiving at the server a change to the criteria of the organized group; and
updating group membership by comparing the characteristics of intelligent devices within the organized group to the criteria.

11. A method for management of intelligent devices according to claim 9, wherein group information includes information about group criteria.

12. A method according to claim 9, wherein device characteristics may include: location, hardware model, software configuration, and device type.

13. A method for management of intelligent devices according to claim 9, wherein a change to the criteria of the organized group is originated by a networked device.

14. A method as claimed in claim 9, in which a client component is associated with each of the members of the organized group, which client components are commonly addressable by the server to set an operating rule for one or more of the members of the organized group.

15. A method as claimed in claim 14 in which each client component is operable to translate an operating rule received from the server for the operating system of the member of the organized group.

16. A method as claimed in claim 15, in which the members of the organized group are addressable commonly or individually.

17. A computer program product for use with a computer for management of intelligent devices within a network, the computer program product comprising a non-transitory medium having a computer readable program code thereon, the computer readable program code including:
computer code for receiving at a server a set of device characteristics, the device characteristics comprising criteria by which an organized group of the networked intelligent devices is defined, and by which membership of an intelligent device within the organized group of intelligent devices may be determined;
computer code for determining at the server membership of intelligent devices within the organized group by comparing a database containing characteristics of intelligent devices within the network to the criteria;
computer code for receiving an update signal from any member of the group, the update signal comprising an updated configuration for the member of the group the criteria for membership;
computer code for determining at the server whether the member of the group still meets the criteria by comparing the updated configuration to the criteria, and for updating the membership of the organized group if the determination of the membership of the member from which the update signal was received indicates that the configuration of the member no longer matches the criteria, so that the intelligent devices actively participate in monitoring their qualification for membership in the organized group;
computer code for receiving at the server a request for organized group information from a networked device other than one of the intelligent devices, wherein the request includes a user's credentials and each organized group includes at least one access level associated with the group information;
computer code for determining, at the server, if the networked device can receive group information based upon the access level associated with the user's credentials; and
computer code for sending group information to the networked device if the computer code for determining has determined, based upon the access level associated with the user's credentials, that the networked device can receive the requested group information.

18. A computer program product according to claim 17, further comprising:
computer code for receiving at the server a change to the criteria of the organized group; and
computer code for determining at the server whether each member of the group still meets the criteria by comparing the updated configuration to the criteria.

19. A computer program product according to claim 17, wherein different access levels provide access to device characteristics for different members of the organized group.

20. A computer program product according to claim 19 wherein device characteristics include location, hardware model, software configuration, and device type.

21. A system for management of intelligent devices according to claim 1, wherein the group information is organized according to access level.

22. A system for management of intelligent devices according to claim 1 wherein the group information includes the criteria of the organized group.

23. A system for management of intelligent devices according to claim 1 wherein the group information includes device characteristics of members of the organized group.

24. A method according to claim 9 wherein group information includes device characteristics and each access level is associated with a different subset of device characteristics.

25. A method according to claim 24 wherein the device characteristics may include: location, hardware model, software configuration, and device type.

26. A computer program product according to claim 17, wherein device characteristics may include: location, hardware model, software configuration, and device type.

* * * * *